United States Patent
Bond et al.

(10) Patent No.: US 6,844,212 B2
(45) Date of Patent: Jan. 18, 2005

(54) GRATING DISPERSION COMPENSATOR AND METHOD OF MANUFACTURE

(75) Inventors: Aaron Bond, Orefield, PA (US); Ram Jambunathan, Allentown, PA (US); Newton C. Frateschi, Breinigsville, PA (US)

(73) Assignee: T-Networks, Inc., Allentown, PA (US)

( * ) Notice: Subject to any disclaimer, the term of this patent is extended or adjusted under 35 U.S.C. 154(b) by 0 days.

(21) Appl. No.: 10/843,743

(22) Filed: May 12, 2004

(65) Prior Publication Data

US 2004/0208446 A1 Oct. 21, 2004

Related U.S. Application Data

(62) Division of application No. 10/167,915, filed on Jun. 11, 2002.
(60) Provisional application No. 60/314,951, filed on Aug. 24, 2001.

(51) Int. Cl.[7] ............................................. H01L 21/00
(52) U.S. Cl. .......................................... 438/31; 438/32
(58) Field of Search ....................... 438/22–47; 216/39; 385/13, 37

(56) References Cited

U.S. PATENT DOCUMENTS

| | | | | |
|---|---|---|---|---|
| 5,410,622 A | * | 4/1995 | Okada et al. ................. | 385/14 |
| 6,081,640 A | * | 6/2000 | Ouellette et al. ............. | 385/37 |
| 6,259,847 B1 | * | 7/2001 | Lenz et al. ................... | 385/131 |
| 6,363,187 B1 | | 3/2002 | Fells et al. | |
| 6,442,311 B1 | * | 8/2002 | Barbarossa et al. ........... | 385/37 |
| 6,519,390 B2 | * | 2/2003 | Fells et al. .................... | 385/37 |
| 6,522,809 B1 | * | 2/2003 | Takabayashi et al. ......... | 385/37 |
| 6,597,838 B1 | * | 7/2003 | Park et al. .................... | 385/37 |
| 2002/0191912 A1 | * | 12/2002 | Robinson et al. ............. | 385/37 |
| 2003/0035629 A1 | * | 2/2003 | Painchaud et al. ............ | 385/37 |
| 2003/0186142 A1 | * | 10/2003 | Deshmukh et al. ........... | 430/30 |
| 2004/0081393 A1 | * | 4/2004 | Singh et al. .................. | 385/27 |

* cited by examiner

*Primary Examiner*—Savitri Mulpuri
(74) *Attorney, Agent, or Firm*—RatnerPrestia

(57) ABSTRACT

A grating dispersion compensator (GDC), including: a substrate; a dielectric grating layer; a planar waveguide; and a passivation layer; is disclosed. The dielectric grating layer may be formed on the substrate and includes a variation in refractive index. This variation in refractive index defines a grating period. The grating period may vary along the longitudinal axis of the GDC according to a predetermined function. A selected center wavelength and dispersion curve may be created. The chirp of the grating period may be controlled by current, voltage, temperature, or pressure. The planar waveguide is formed on the dielectric grating layer and includes an input/output (I/O) surface normal to the longitudinal axis of the planar waveguide. The passivation layer is formed on the planar waveguide. Alternatively, a GDC may be formed with the dielectric grating layer on top of the planar waveguide rather than beneath it.

17 Claims, 26 Drawing Sheets

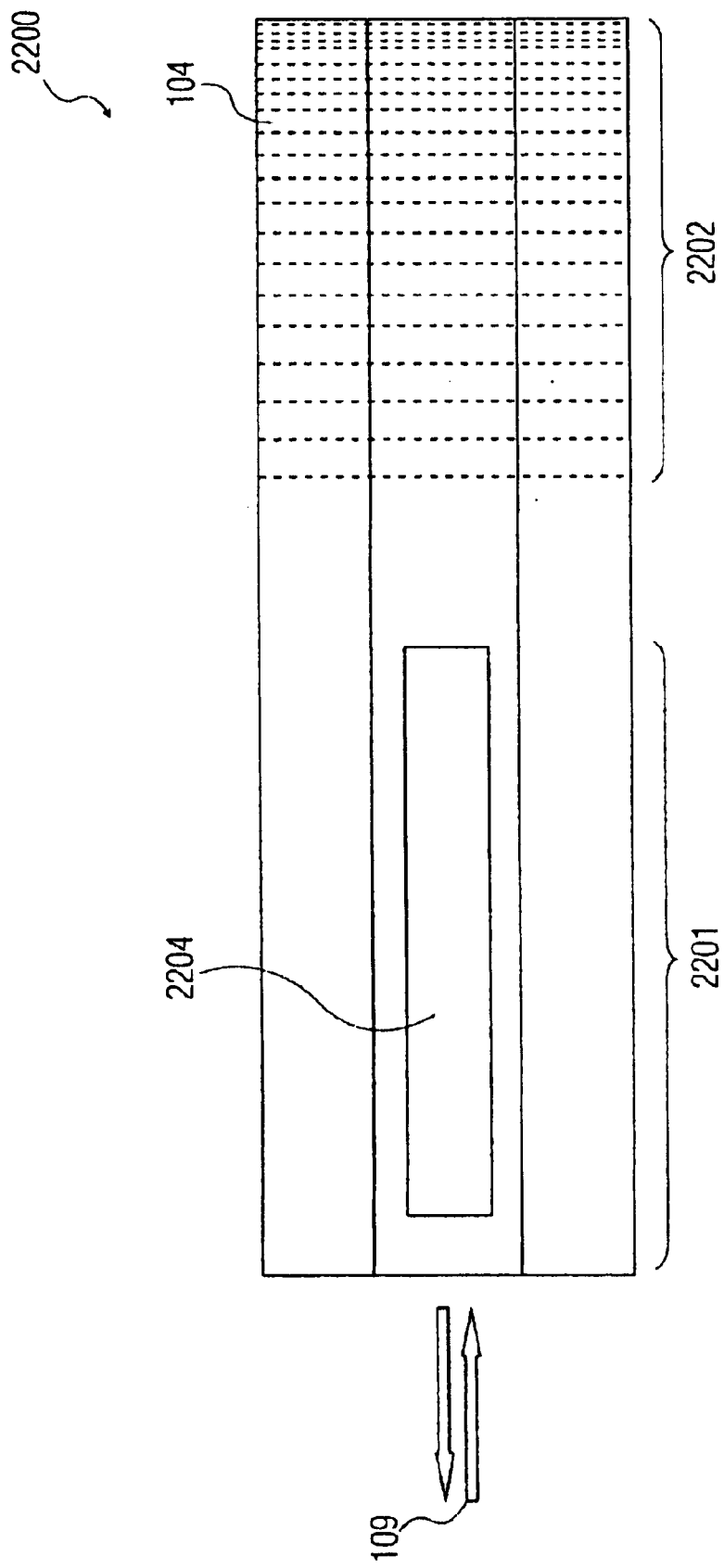

GRATING DISPERSION COMPENSATOR AND METHOD OF MANUFACTURE

CROSS-REFERENCE TO RELATED APPLICATIONS

This application is a divisional application of U.S. patent application Ser. No. 10/167,915, filed Jun. 11, 2002, which claims priority of U.S. Provisional Application No. 60/314,951, filed Aug. 24, 2001, the contents of which are incorporated herein by reference.

This invention relates to grating dispersion compensators. More particularly this invention relates to dispersion compensation gratings integrally formed within planar waveguide apparatuses.

BACKGROUND OF THE INVENTION

Optical communication systems use pulses of light to transmit data. The light used to create these pulses necessarily contains a band of wavelengths, rather than a single wavelength, even though the light is generally from laser sources. A broadening of the wavelength band occurs when the light is pulsed, due to conditions imposed by the Fourier transform spectrum of the pulse shape. Some devices, such as electro-absorption modulators (EAM's), used to generate the pulses broaden the wavelength band of the light even further than the transform limit. The desire for ever higher speed optical communications requires ever shorter pulses of light, with ever larger wavelength bands. A problem related to this growing wavelength band of optical pulses is temporal broadening due to chromatic dispersion.

Many components of optical communications system, such as the optical fibers, EAM's, semiconductor optical amplifiers (SOA's), and variable optical attenuators (VOA's), have chromatic dispersion. The existence of chromatic dispersion in the system means that different wavelengths of light travel at different speeds within the system. This phenomenon may lead to temporal pulse broadening. For example, in SMF28 fiber, operating at 1550 nm, longer wavelengths of light travel more slowly within the optical fiber than shorter wavelengths. The dispersion factor, D, in this example is 17 ps/nm/km. Therefore, the shorter wavelengths in a pulse move ahead of the longer wavelengths, broadening the pulse. As the length of the fiber increases this broadening accumulates and chromatic dispersion ultimately limits the maximum distance a data stream can be transmitted before the pulses become indistinguishable due to broadening. For a transform-limited pulse operating at 40 GB/S, the distance before the signal deteriorates significantly due to chromatic dispersion is approximately 4 km.

It is, therefore, desirable to compensate for this chromatic dispersion effect by introducing dispersion compensators, which have an opposite effect. A number of methods for introducing this dispersion compensation have been used, such as dispersion compensating fibers (DCF's) or fiber Bragg gratings. Generally, these methods are not easily tunable and, therefore, can only be used for compensating fixed dispersion values. It is impractical to design a specific DCF or fiber Bragg grating for every possible chromatic dispersion due to various lengths of optical fiber or other optical components in a communications signal. Also, in wavelength division multiplex systems, owing to differences in the slope of dispersion compensated fibers and standard fibers such as SMF28 fibers, each channel would need to be fine tuned individually.

In a reconfigurable optical communications network the chromatic dispersion may be varied when the path length changes due to cable damage, overload, or other rerouting. This also may be a problem for fixed dispersion compensation devices such as DCF's or fiber Bragg gratings.

U.S. Pat. No. 6,363,187 B1 to Fells et al. describes an optical waveguide provided with a linearly chirped Bragg reflective grating which can be used to provide linear dispersion compensation. The amount of dispersion compensation provided by this device can be adjusted by changing the magnitude of the axial strain imposed on the grating. Fells et al. disclose that, adjusting the linear dispersion of the grating in this manner requires the presence of a quadratic chirp term, either within the grating itself or within the strain placed upon the grating. This quadratic chirp term leads to additional difficulties and, therefore, should be compensated, at least in part, by causing the optical signal to be reflected by a second Bragg reflective grating with a quadratic component of chirp having an opposite sign to that of the original Bragg reflective grating.

Fells et al. also note that similar effects may be achieved by adjusting the effective refractive index of the waveguide grating structure by changing the temperature of the waveguide, possibly creating a temperature gradient along the longitudinal access of the waveguide in the process. In this temperature tunable dispersion compensating device disclosed by Fells et al., the temperature in both the original chirped Bragg reflective grating and the secondary Bragg reflective grating used for quadratic chirp term compensation should be varied simultaneously.

There is therefore a useful role for an adjustable amplitude linear dispersion compensation device. Such a device could be one designed for operation on its own to achieve substantially complete dispersion compensation. Alternatively, it could be one designed for operation in association with a fixed amplitude dispersion compensation device, such as a length of DCF, that provides a level of compensation which is inadequately matched on its own. The adjustable device may be operated with some form of feedback control loop to provide active compensation that can respond to dynamic changes of dispersion within the system, and in suitable circumstances to step changes resulting from re-routing occasioned, for instance, by a partial failure of the system such as a transmission fiber break.

SUMMARY OF THE INVENTION

One embodiment of the present innovation is an exemplary grating dispersion compensator (GDC), which includes a substrate, a dielectric grating layer, a planar waveguide, and a passivation layer. The dielectric grating layer is formed on the top surface of the substrate and includes a variation in index of refraction. This variation in index of refraction defines a grating period. The grating period may vary along the longitudinal axis of the GDC according to a predetermined function. The variable (chirped) grating period causes different wavelengths of light to have different transit times within the GDC. A selected center wavelength and dispersion curve may be created. The planar waveguide is formed next on the dielectric grating layer and includes an input/output (I/O) surface. The longitudinal axis is normal to the I/O surface of the planar waveguide. The passivation layer is formed on the planar waveguide. An alternative exemplary GDC may be formed in which the dielectric grating layer is formed on top of the planar waveguide rather than beneath it.

In an alternative embodiments of the present invention, an effective grating period chirp may be formed by means other than varying the actual grating period of the dielectric grating layer. These alternative embodiments allow an effective variation in the grating period whether the actual grating period of the dielectric grating layer varies or not.

One such alternative embodiment is to curve the planar waveguide. The grating period along the, curved, longitudinal axis of the curved planar waveguide may then be varied as desired due to the variation in angle between the axis of the grating and the longitudinal axis of the planar waveguide.

Another such alternative embodiment uses a variation in the index of refraction along the longitudinal axis of the planar waveguide to create an effective grating period chirp. This exemplary planar waveguide may include a quantum well structure. The thickness of the waveguide may be varied along the longitudinal axis as desired using selective area growth. This thickness variation changes the index of refraction of the waveguide due to the quantum well structure.

Other embodiments of the present innovation are exemplary dynamically tunable GDC's, including electrically-controlled GDC's, thermally-controlled GDC's, and pressure-controlled GDC's. These exemplary dynamically tunable GDC's include a substrate, a dielectric grating layer, a planar waveguide, and a passivation layer. The dielectric grating layer includes a variation in index of refraction, defining a grating period. The grating period may be constant, or may vary along the longitudinal axis of the GDC according to a predetermined function.

An exemplary electrically-controlled GDC includes at least one substrate electrode coupled to the substrate and at least one top electrode coupled to the passivation layer. By controlling the voltages and/or currents between these electrodes, the center wavelength and/or the shape of the dispersion curve of the GDC may be tuned.

An exemplary thermally-controlled GDC includes at least one heating element coupled to the front portion of the passivation layer, near the I/O surface of the waveguide. By controlling the temperature of the heating element(s) to create temperature gradients in the GDC, the center wavelength and the shape of the dispersion curve of the GDC may be tuned. Exemplary heating elements may be resistive heating elements or a thermo-electric coolers. In one alternative embodiment a resistive heating element is formed over the passivation layer such that the linear resistivity, and therefore the heat generated, varies along the longitudinal axis. A first electrical contact is coupled to the front portion of the resistive heating element, near the I/O surface of the planar waveguide, and a second electrical contact is coupled to the back portion of the resistive heating element, near the other end of the planar waveguide.

An exemplary pressure-controlled GDC includes a plurality of electrodes coupled to the sides of the passivation layer and at least a portion of the passivation layer includes a piezoelectric material electrically coupled to the first electrode and the second electrode. By controlling the internal pressure of created by the piezoelectric material in the GDC, the center wavelength and the shape of the dispersion curve of the GDC may be tuned.

A further embodiment of the present invention is an exemplary apodized GDC. Exemplary apodized GDC's are formed by applying an apodization technique to a previously described exemplary GDC. Exemplary apodization techniques include: forming a spacing layer with a variable thickness between the dielectric grating layer and the waveguide; and varying a dimension, either thickness or width, of the dielectric grating layer along the longitudinal axis of the waveguide.

Yet another alternative embodiment of the present invention is an exemplary dispersion compensated optical signal detection apparatus. The exemplary dispersion compensated optical signal detection apparatus includes a circulator, an exemplary GDC of the present invention, and an optical detector. The exemplary GDC and the optical detector are optically coupled to the circulator.

A further alternative embodiment of the present invention is an exemplary dispersion compensated optical signal amplification apparatus. This dispersion compensated optical signal amplification apparatus includes a first optical fiber, a circulator, an exemplary GDC of the present invention, a semiconductor optical amplifier (SOA), and a second optical fiber optically coupled to the SOA. The first optical fiber, exemplary GDC, and SOA are optically coupled to the circulator. The second optical fiber is optically coupled to the SOA.

In an alternative exemplary embodiment of the dispersion compensated optical signal amplification apparatus, the SOA is between the circulator and the exemplary GDC and the second optical fiber is optically coupled to the circulator instead of the SOA.

Still another alternative embodiment of the present invention is an exemplary monolithic optical chip. An exemplary monolithic optical chip includes a substrate, a waveguide layer, and a passivation layer. In the back portion of the exemplary monolithic optical chip, the substrate includes a second layer, which forms an optical grating section, and the waveguide layer includes a GDC waveguide section. These sections form a GDC. In the front portion of the exemplary monolithic optical chip a second optical device is formed within the monolithic structure. This second optical device may be an active optical device, or a passive optical device. For an exemplary embodiment including an active second optical device, the waveguide layer includes an active layer section of planar waveguide and an I/O surface at the front end of the monolithic optical chip. A first electrode is coupled to the substrate and a second electrode coupled to the passivation layer over the active device section of the waveguide layer. For an exemplary embodiment including the passive second optical device, the waveguide layer includes an input surface, an output surface, and a circulator section within the front portion of the monolithic optical chip.

Additional alternative embodiments of the present invention, include exemplary methods of manufacturing exemplary GDC's. A first exemplary method of manufacture includes several steps. A substrate is provided. A grating layer base is formed on the substrate, then defined and etched to form a grating pattern. A grating top layer is formed over the etched grating base layer such that the grating top layer and the grating base layer form a dielectric grating layer having an index of refraction that changes to define at least one grating period. A waveguide layer is formed over the dielectric grating layer and defined and etched to form a waveguide. A passivation layer is formed over the waveguide. A waveguide input/output surface is then formed on the waveguide, often by cleaving the GDC from a wafer.

A second exemplary method of manufacture includes many of the same steps. A substrate is provided. A waveguide layer is formed over the substrate and defined and etched to form a waveguide. A spacing layer is formed on the waveguide and the substrate. The spacing layer includes a grating layer base, which is defined and etched to form a grating pattern. A grating top layer is formed over the etched grating base layer such that the grating top layer and the grating base layer form a dielectric grating layer having an index of refraction that changes to define at least one grating period. A passivation layer is formed over the grating top layer. A waveguide input/output surface is then formed on the waveguide, often by cleaving the GDC from a wafer.

BRIEF DESCRIPTION OF THE FIGURES

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 22B is a top plan drawing of an exemplary monolithic optical chip including a GDC.

DETAILED DESCRIPTION OF THE INVENTION

Figure 1A:
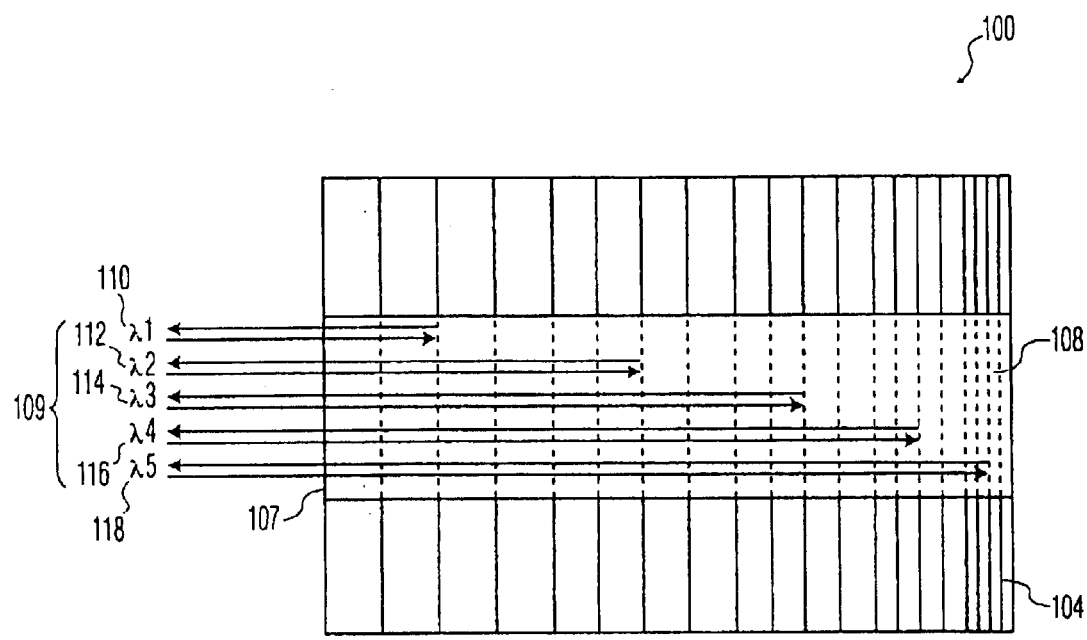
FIG. 1A is a top plan drawing of an exemplary GDC with a chirped grating.
Figure 1B:
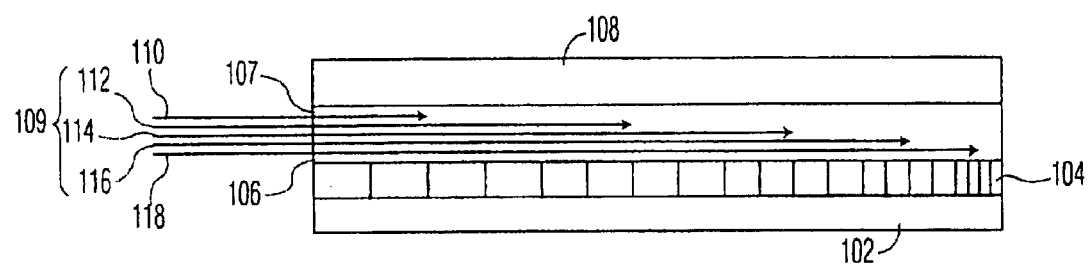
FIG. 1B is a side plan drawing of an exemplary GDC with a chirped grating.

One exemplary embodiment of the present invention, illustrated in FIGS. 1A and 1B, is GDC 100 including chirped optical grating 104. FIG. 1A is a top plan drawing and FIG. 1B is a side plan drawing of GDC 100. The exemplary device includes substrate 102, chirped optical grating 104, wave guide 106, and passivation layer 108. Waveguide 106 desirably exhibits low optical loss and a relatively high index of refraction in the desired wavelength band. Although the exemplary devices described in the present application are formed from various III/V materials, such as InP, GaAs, AlGaAs, or InGaAsP, other possible materials choices are contemplated. Possible alternative materials for waveguide 106 include: doped silica (similar to optical fibers); silicon; germanium; and other dielectric materials, which have low optical loss characteristics for the desired wavelength band and a relatively easily variable index of refraction.

Passivation layer 108 and chirped optical grating 104, and preferably substrate 102 as well, have a lower index of refraction than waveguide 106 and act as cladding layers. The materials for these three layers may desirably be selected from a related family of materials to the material used to form waveguide layer 106. Such a material selection may minimize scattering at the boundaries between layers and may also improve the quality of crystalline materials by reducing lattice mismatches between layers.

Additionally, waveguide 106 may contain a number of sub-layers, forming a quantum well structure within this layer. A quantum well waveguide structure may be desirable to increase the tunability of the index of refraction within the waveguide. This structure may include a single quantum well, multiple quantum wells, or separate confinement layers. Substrate layer 102 and passivation layer 108 may also contain a plurality of sub-layers. It is often desirable for passivation layer 108 to extend around the waveguide on the sides as well as over the top of waveguide 106, as shown in FIG. 8C.

In addition to serving as a cladding layer, passivation layer 108 may also desirably function as the p-type material of a P-I-N structure. A quantum well structure may be particularly desirable for exemplary tunable GDC's, such as those described below with respect to FIGS. 12A–14C.

FIGS. 1A and 1B also illustrate how an incident optical signal 109 having a number of different wavelengths $\lambda_1$, $\lambda_2$, $\lambda_3$, $\lambda_4$, and $\lambda_5$ (represented by arrows 110, 112, 114, 116, and 118) is reflected by exemplary GDC 100. It is noted that the inclusion of five distinct wavelengths is merely for illustration purposes as is the spatial separation of the arrows 110, 112, 114, 116, and 118. Chirped optical grating 106 includes a periodic structure formed of two materials with differing Indices of refraction. It is also noted that the periodic structure of optical grating 106 is shown to include only grating periods for each exemplary wavelength. This extremely limited number of grating periods is merely for illustrative purposes. It is also contemplated that the variation of grating periods may be smooth rather than a stepped function, as shown. It is further noted that representation of the periodic structure of optical grating 106 shown in FIGS. 1A and 1B is somewhat abstracted. This periodic structure may be formed individual grating elements of a higher index of refraction formed with a material having a lower index of refraction. Alternatively the periodic structure may be a variation in the thickness of two materials of optical grating 106. This variation may resemble a square wave, a triangular wave, a sine wave, or other periodic oscillation.

As shown, it is generally desirable for chirp of optical grating 106 to progress from larger spacings in the index of refraction variation, known as the grating period, near input/output (I/O) surface 107 of waveguide 106, to narrower spacings along the longitudinal axis of device 100, i.e. the propagation axis of waveguide 106. This arrangement leads longer wavelengths to be reflected closer to I/O surface 107 and therefore to have a short transit time within exemplary GDC 100. This grating period chirp may be linear, or it may be determined by a predetermined function to more accurately match the chromatic dispersion to be compensated.

Figure 2:
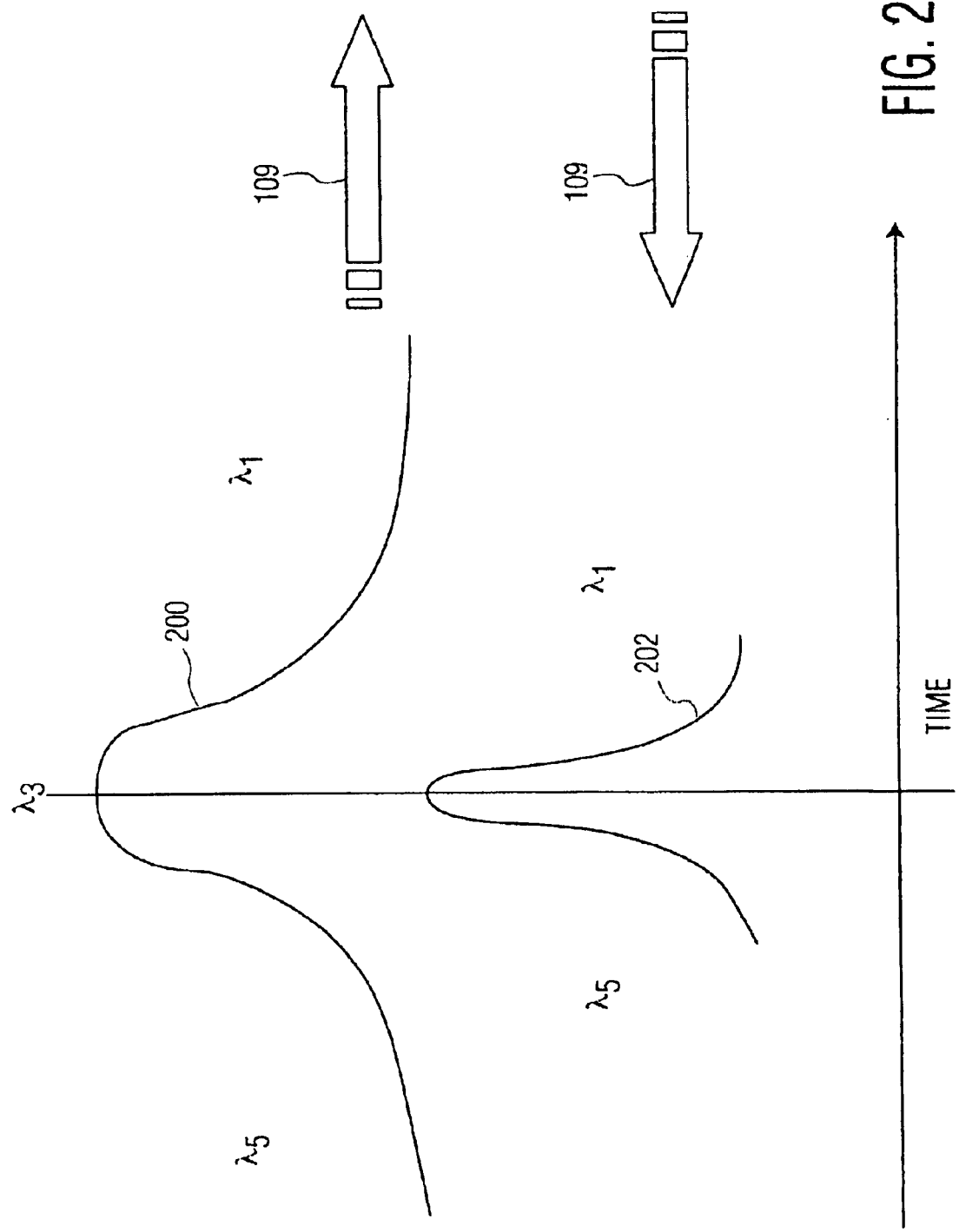
FIG. 2 is a graph illustrating compression of an exemplary optical pulse broadened by chromatic dispersion.

FIG. 2 illustrates the effect of the difference in transit times on exemplary chromatically dispersed optical signal 109. Curve 200 illustrates an exemplary dispersion broadened pulse before entering exemplary GDC 100 and curve 202 illustrated the recompressed pulse exiting the device.

Even though the majority of the light is confined within the waveguide, proper selection of indices of refraction in the device may desirably allow enough of the optical field to extend into the chirped optical grating for Bragg reflection to occur at resonant wavelengths, similar to methods employed to create feedback in distributed feedback (DFB) lasers. Resonant wavelengths are those wavelengths where an integral number of wavelengths are substantially equal to twice the grating period. The grating period is based on the effective optical distance between the alternating material portions of the grating element. The period of chirped optical grating 104 is varied along the longitudinal axis of the device. Therefore, different wavelengths are reflected at different distances due to diffraction from chirped optical grating 104. Desirably, larger grating periods occur near the input of the device and the first order Bragg reflection is significant. Such a chirped optical grating design may help to limit losses due to secondary reflections back into the device, as well as substantially limiting reflections to first-order Bragg reflections only. Apodization methods, described below with respect to FIGS. 9A, 9B, and 10 may be used as well.

Alternatively, it is contemplated that a negative chirp may be created in the chirped optical grating, with shorter grating periods near the input of the device. Such a negatively chirped GDC may be used to fine tune over-compensated systems, or may be tailored to other applications for which negative dispersion compensation may be desirable. The relatively narrow bandwidth most pulsed laser systems desirably reduces the effect of second-order, or higher, Bragg reflections.

It is not always practical to couple light emitted from optical fibers into a planar waveguide as either a pure TE or TM mode. Therefore it is desirable to account for both TE and TM modes during design. Inefficiencies may occur in exemplary GDC 100 due to possible dispersion between TE and TM modes in waveguide 106. It is, therefore, desirable to limit this polarization modal dispersion. Designing waveguide 106 to have an approximately square cross-section, as shown in FIG. 3, is one method, which may be used to limit dispersion between TE and TM modes in waveguide 106.

Figure 3:
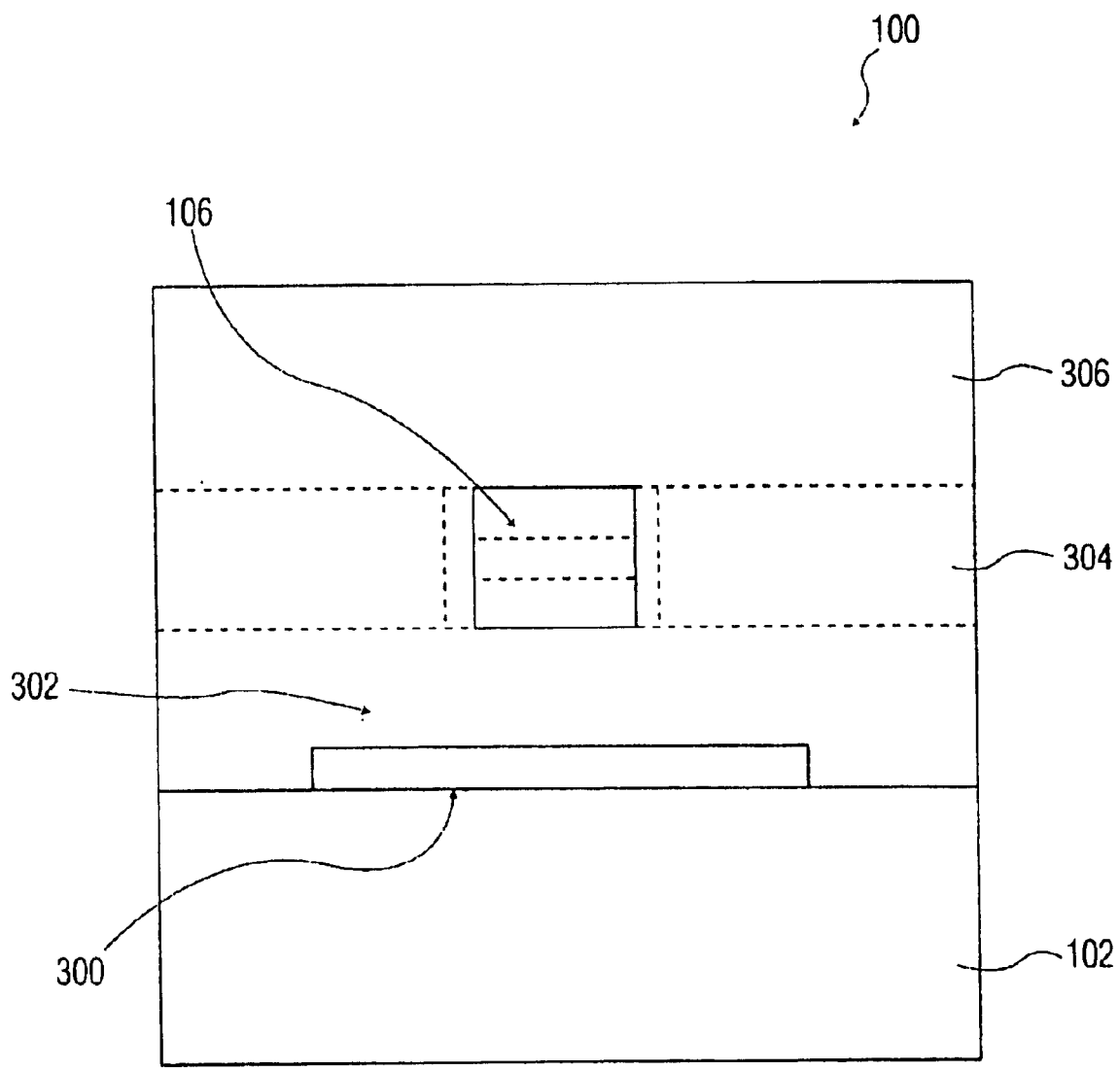
FIG. 3 is a front plan drawing of an exemplary GDC.

FIG. 3 illustrates a front side view of exemplary GDC 100. Grating layer 104 from FIGS. 1A and 1B is shown as two sub-elements, spacing layer 302 formed of a first material and grating element 300 formed of a second material having a higher index of refraction than the material of spacing layer 302. Spacing layer 302 is desirably formed of the same material as substrate 102 to avoid possible unwanted scattering due to an index of refraction difference between the spacing layer and the substrate. The difference in the indices of refraction of grating element 300 and spacing layer 302 desirably provide the small amount of scattering which leads to Bragg reflections in exemplary GDC 100. The amount of scattering may be controlled by a number of variables, including: the indices of refraction of grating element 300 and spacing layer 302; the thicknesses of grating element 300 and spacing layer 302; and the width of grating element 300. The width of grating element 300 may desirably be greater than the width of waveguide 106 in the main reflecting portion of the device. The thicknesses and indices of refraction of the grating layer sub-elements may be optimized for the wavelengths desired to be compensated. The material family desired to be used in the device may also affect this optimization.

Figure 14A:
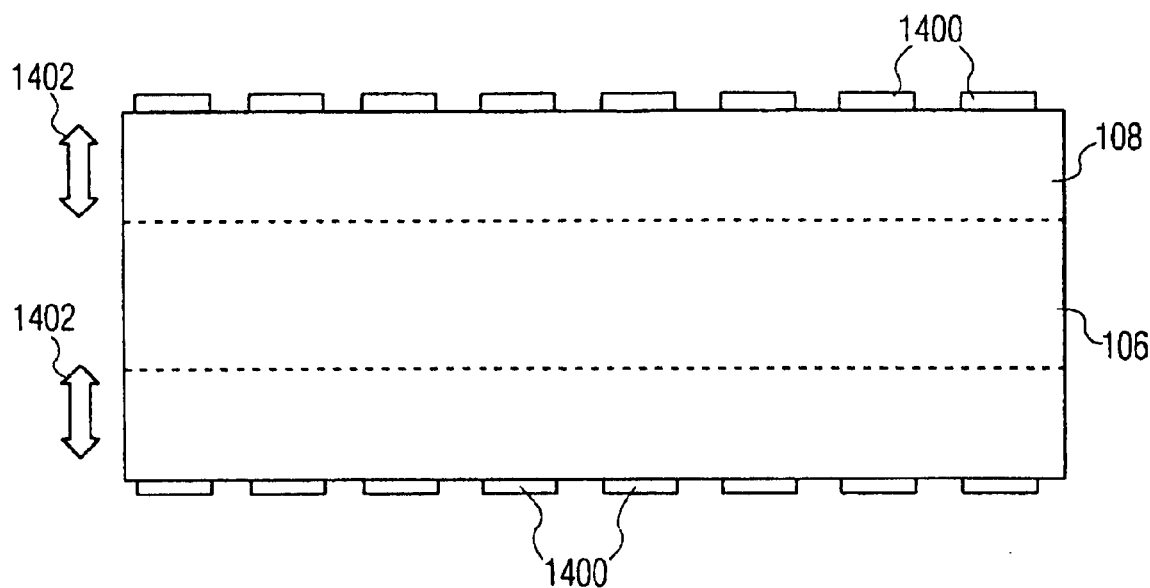
FIG. 14A is a top plan drawing of an exemplary pressure-controlled dynamically tunable GDC.
Figure 14B:
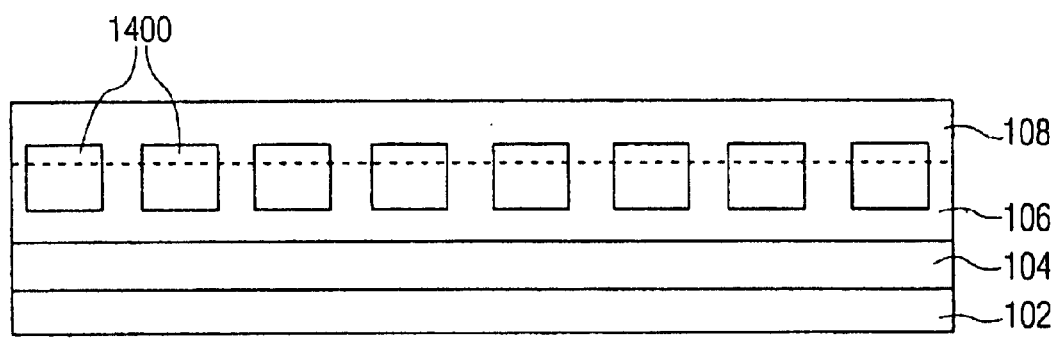
FIG. 14B is a side plan drawing of an exemplary pressure-controlled dynamically tunable GDC.
Figure 14C:
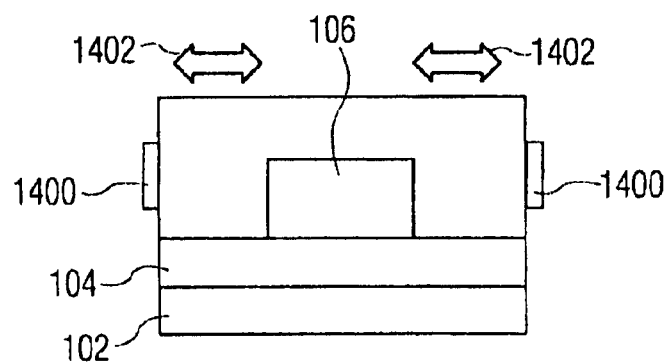
FIG. 14C is a front plan drawing of an exemplary pressure-controlled dynamically tunable GDC.

The passivation layer is also shown as two sub-elements, side passivation layers 304 and top passivation layer 306. It may be desirable for these passivation layer sub-elements to have different compositions in exemplary tunable GDC's described below, particularly those shown based on electrical tuning (FIGS. 12A and 12B) and pressure tuning (FIGS. 14A–C).

Exemplary GDC 100 may be designed for 1.55 μm optical signals, using III/V materials. Such a device may be formed on an InP substrate 102. Spacing layer 302, side passivation layers 304, and top passivation layer 306 are also desirably formed of InP. Grating element 300 and waveguide 106 are desirably formed of InGaAsP material. The exemplary bandgap of grating element 300 is desirably 1.1 μm, while waveguide 106 desirably has a bandgap of 1.0 μm. Waveguide 106, in this exemplary embodiment, is 0.9 μm×0.9 μm. Grating element 300 are 3.0 μm×0.1 μm. Spacing layer 302 has a thickness of a 0.5 μm between waveguide 106 and grating element 300. This exemplary GDC desirably provides a periodic perturbation in the effective index of refraction along waveguide 106 of approximately $5\times10^{-4}$.

Figure 4:
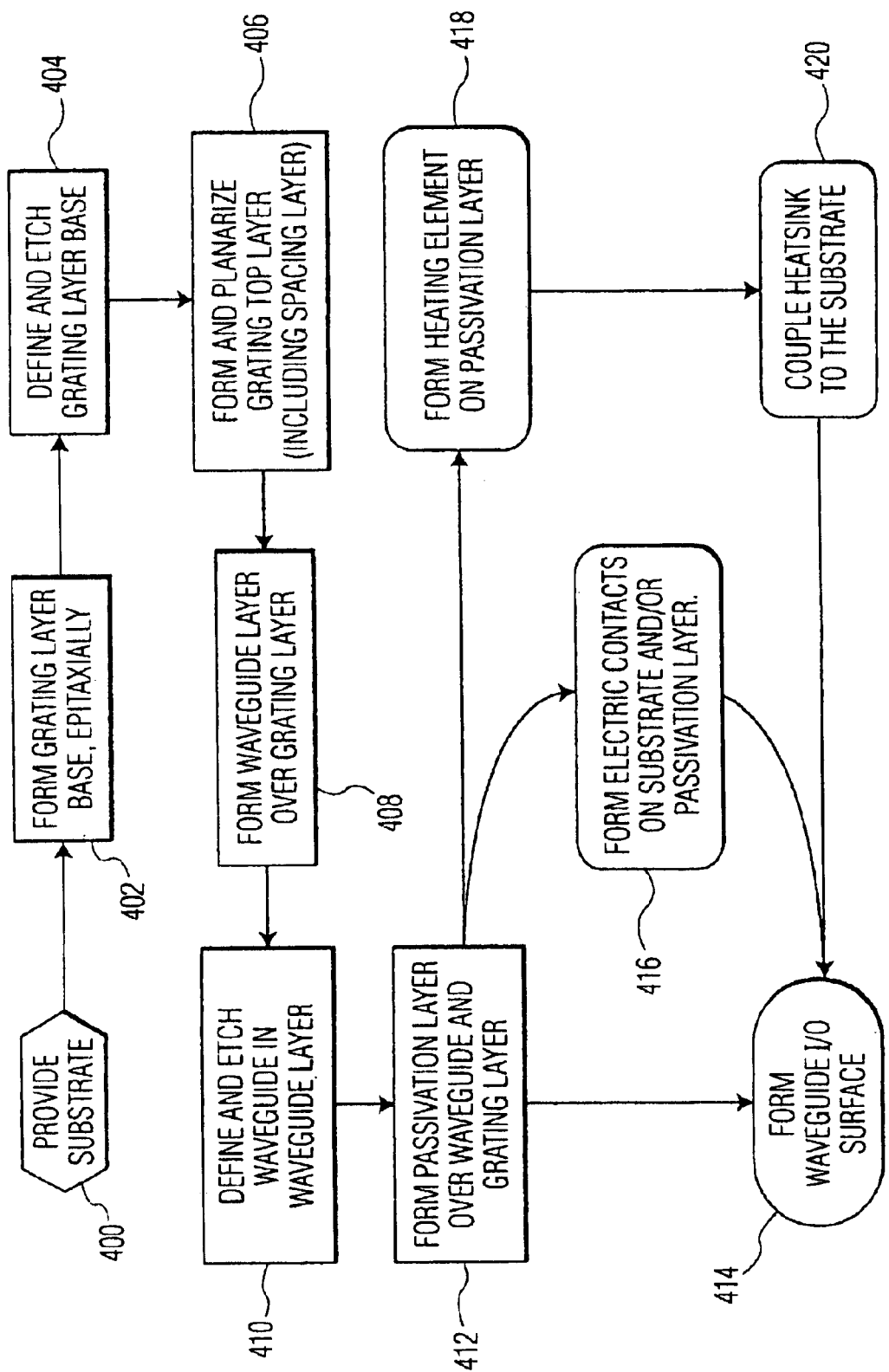
FIG. 4 is a flowchart illustrating exemplary manufacture method of an exemplary GDC.

FIG. 4 is a flowchart describing an exemplary technique for producing a GDC according to the present invention. FIGS. 5A–C, 6A–C, 7A–C, and 8A–C illustrate various steps of this exemplary fabrication process. Although it is contemplated that other materials may be used, this exemplary method is described in terms of III/V semiconductor materials.

The process begins with a substrate, step 400. Substrate 102, shown in FIGS. 1A, 1B, and 3, may function as both a cladding layer to assist in containment of the beam in the device and as the N layer of the P-I-N, possibly quantum well, diode structure or may function as only a cladding layer. (Although this description assumes that the substrate is the N side of the P-I-N structure, one skilled in the art will understand that the substrate could be the P side with the passivation layer 108 formed of N-type material instead.) The substrate in this exemplary device is preferably formed of a III/V semiconductor, such as InP, GaAs, InGaAsP, InGaAs, or InAlGaAs. The substrate may also be formed of multiple layers such as GaAs grown on silicon or alumina.

Next grating base layer 500 is grown, step 402. Metal organic chemical vapor deposition (MOCVD) is the preferred method for deposition of this sub-layer, but other epitaxial deposition techniques may also be employed, such as molecular beam epitaxy (MBE), chemical beam epitaxy (CBE), and liquid phase epitaxy (LPE). This layer is the basis of the grating element and desirably is composed of InGaAsP with an index of refraction higher than that of the substrate.

Selective area growth (SAG) may be used to grow a layer of varying thickness. Therefore, the thickness of grating base layer 500 can easily be modified through the use of SAG to help provide apodization of the grating device, which is described below with reference to FIG. 9A. The thickness variation in the grating base layer 500 may be desirably gentle enough to be adiabatic, thereby diminishing the possibility of unwanted scattering losses within an exemplary GDC using this technique.

To perform SAG of grating base layer 500 a patterned growth-retarding layer is formed on the top surface of the substrate before growing grating base layer 500. Materials which retard growth of III/V materials, such as SiN or $SiO_2$, make up the growth-retarding layer. The growth-retarding layer may be formed and patterned using any standard techniques known in the semiconductor industry. In the areas covered by the growth retarding layer growth is substantially inhibited and material which falls upon the growth retarding layer diffuses laterally across the surface. Near the growth-retarding regions the growth rate is enhanced owing to gas phase diffusion and surface diffusion of the reactants in the MOCVD, or other epitaxial, reactor away from growth-retarding regions. After grating base layer 500 is grown the growth retard areas may be removed. Thickness variations of 5:1 or greater are attainable in this manner.

Figure 5A:
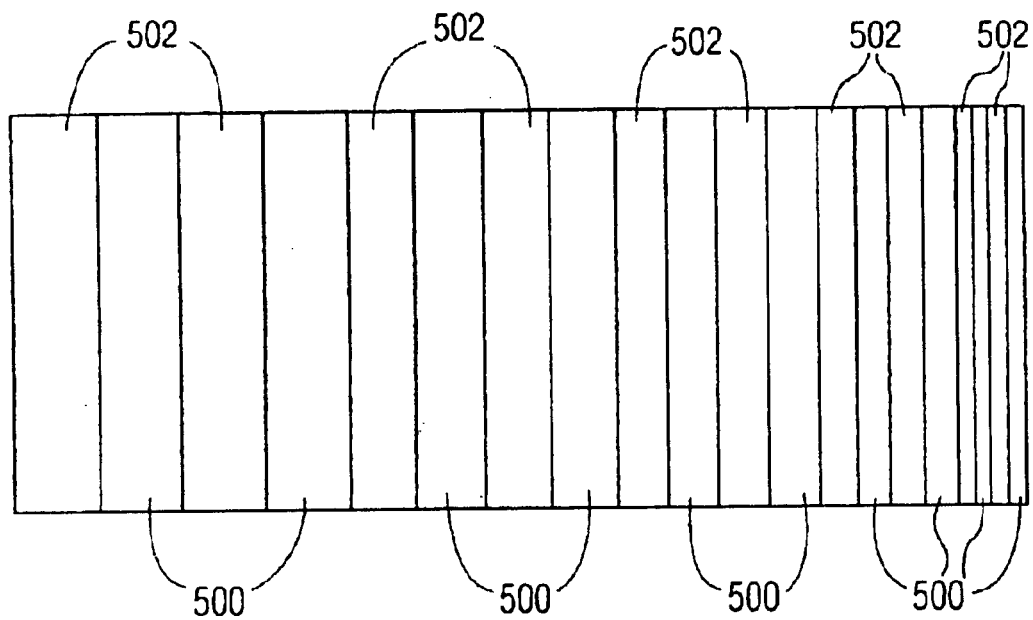
FIGS. 5A, 6A, 7A, and 8A are top plan drawings of an exemplary GDC during manufacture according to the flowchart of FIG. 4.
Figure 5B:
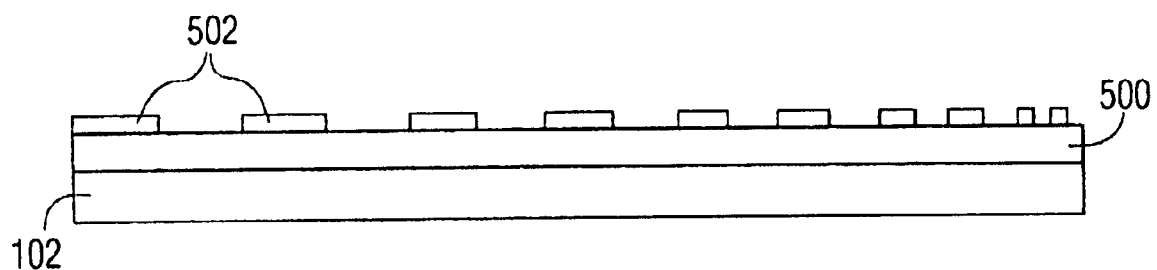
FIGS. 5B, 6B, 7B, and 8B are side plan drawings of an exemplary GDC during manufacture according to the flowchart of FIG. 4.
Figure 5C:
FIGS. 5C, 6C, 7C, and 8C are front plan drawings of an exemplary GDC during manufacture according to the flowchart of FIG. 4.

The grating base layer is defined and etched to form the grating element in step 404. A resist layer is applied on top of grating base layer 500 and patterned, as shown in FIGS. 5A–C. The pattern for this resist layer may be written using techniques similar to those employed in the production of distributed feedback (DFB) lasers, such as e-beam lithography. Alternatively, resist layer pattern 502 may be formed using a modified holographic technique. The holographic pattern is first formed as a fringe pattern between interfering light beams. As the holographic pattern is swept across the device to expose the resist, the device may be moved in a controlled manner by a precise movement stage, such as a piezoelectric solenoids, to alter the apparent spacing between fringes relative to the surface of the resist.

Figure 6A:
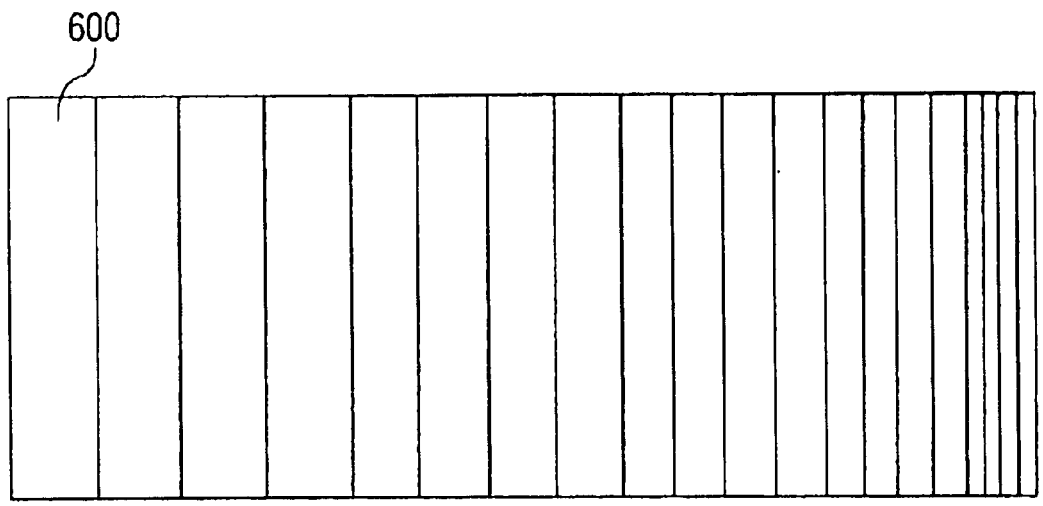
Figure 6B:
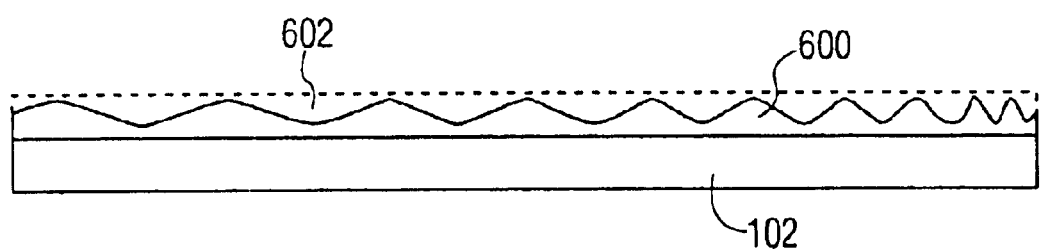
Figure 6C:
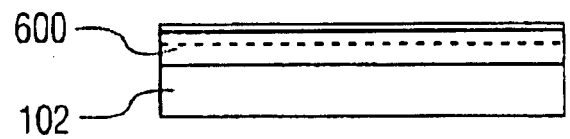
Figure 10:
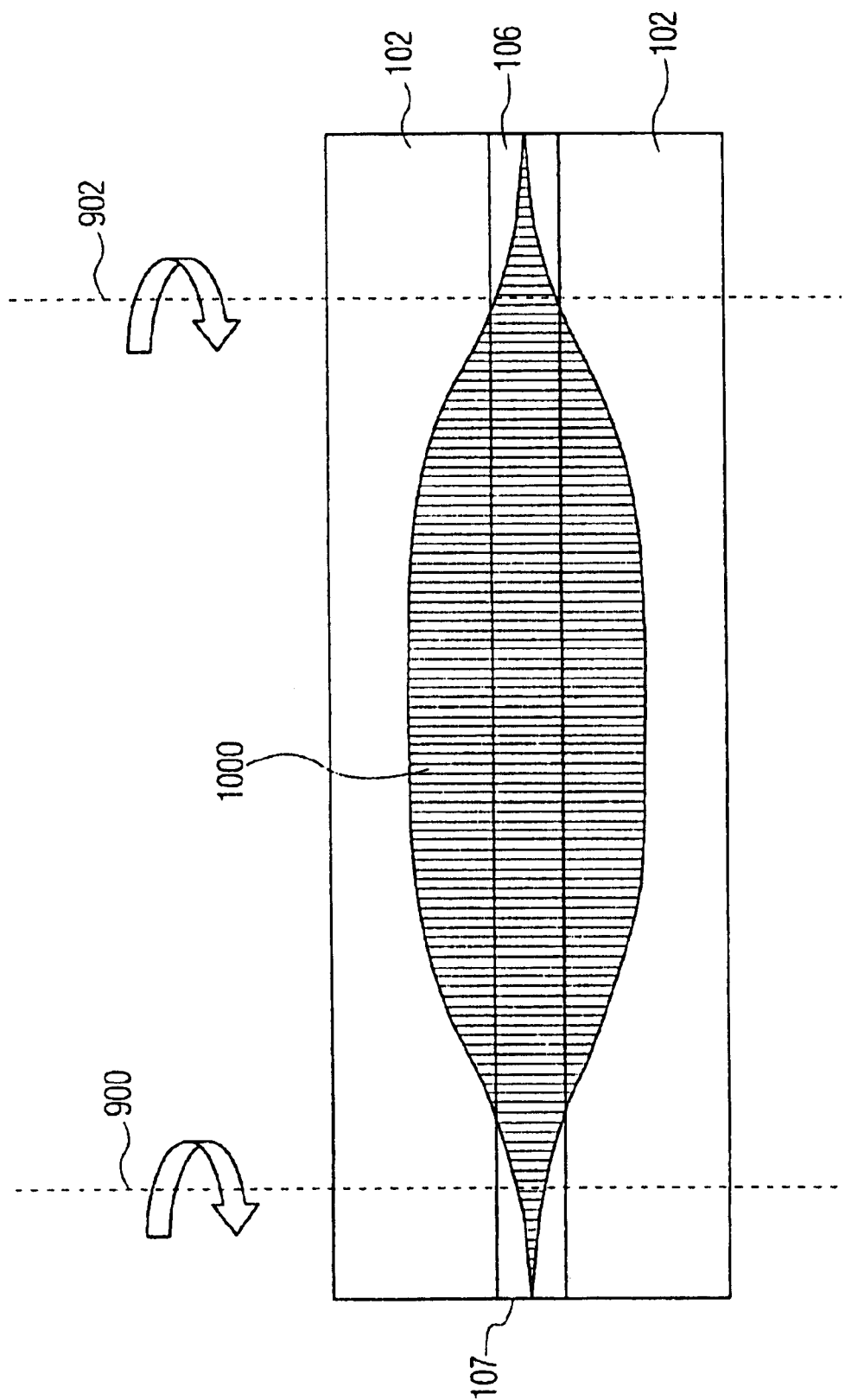
FIG. 10 is a top plan drawing of an alternative exemplary GDC using grating width variation for apodization.

The grating base layer is then etched, and the resist is removed. This etch procedure preferably uses a wet etch technique, but a dry etch or combination may be employed. A wet etch may provide less abrupt edges. Grating base layer 500 may be etched to form grating element 600 with an undulating surface, such as shown in FIGS. 6A and 6B, or the layer may be etched completely though to the base layer forming a plurality of individual grating sub-elements. Separating the grating element into individual sections in this manner may be particularly desirable for grating base layers formed using SAG. Also it may be desirable to etch, or form, grating base layer 500 so that a narrower grating element, which does not extend over the full width of substrate 102, may be formed. Grating element 300 in FIG. 3 and tapered grating element 1000 in FIG. 10 illustrate two possible exemplary narrower grating elements.

In an alternative embodiment, the forming, defining, and etching grating base layer 500, steps 402 and 404, may be performed by an SAG technique. Patterned growth-retarding regions may be formed to induce grating base layer 500 to be formed with a desirably undulating surface so that no etching is needed. A grating base layer formed in this manner may additionally be designed for apodization at the same time.

Figure 8A:
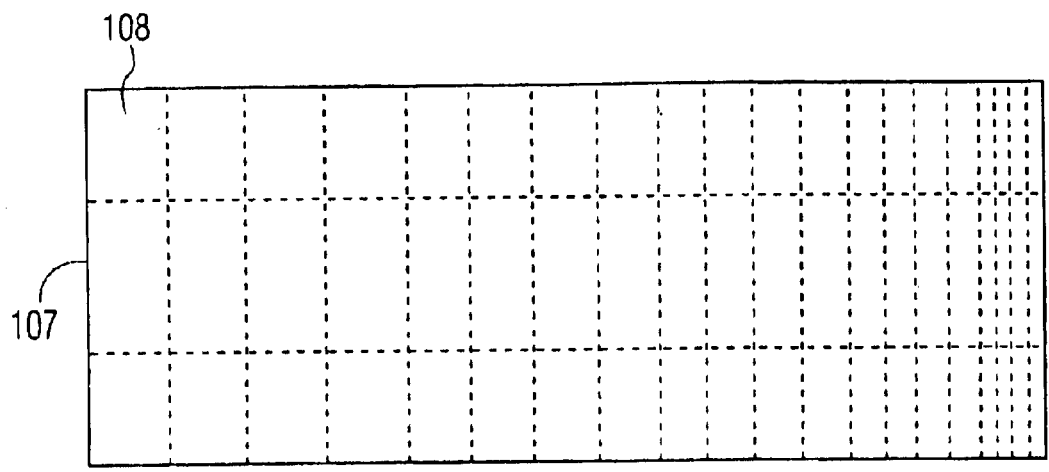
Figure 8B:
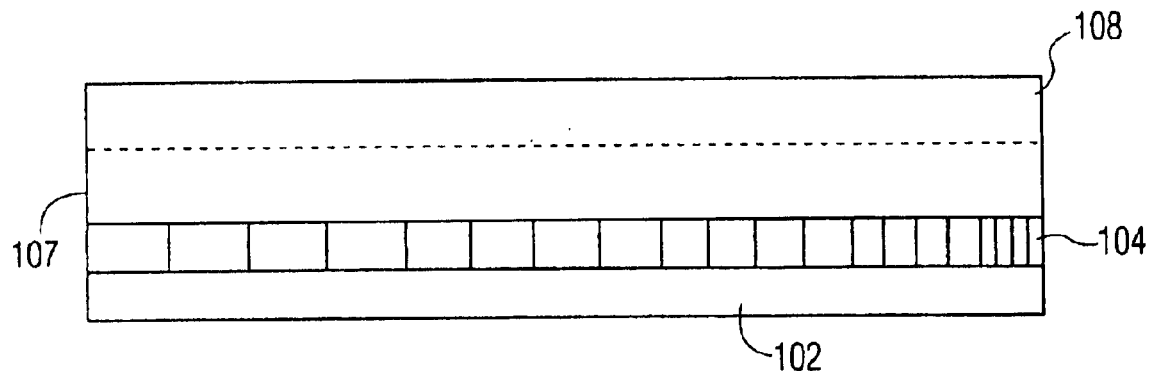
Figure 8C:
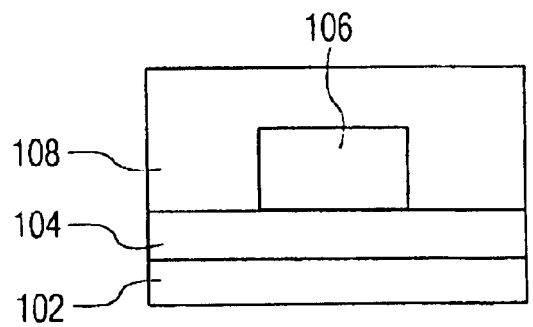

FIGS. 1A and 1B illustrate an exemplary GDC with a chirped optical grating, as do FIGS. 8A–C. The various alternative exemplary tunable GDC's illustrated in FIGS. 11, 12A, 12B, 13A, 13B, 14A–C, and 17 may be formed with a chirped optical grating as well, or they may be formed with a grating having a constant spacing. If a grating having a constant spacing is desired then the pattern defined in the resist layer has a constant spacing. The only step of the exemplary method of FIG. 4 effected by this difference is step 404 (shown in FIG. 4).

Next, grating top layer 602 (shown in phantom), which includes the spacing layer, is formed over grating element 600 (shown in FIG. 6), and any exposed sections of the top surface of substrate 102, step 406. It may be preferable for the grating top layer to be formed of the same material as substrate 102. The grating top layer desirably has a lower index of refraction than the grating element 600. This layer may be preferably formed using an epitaxial technique. The surface may then be planarized to provide an improved surface upon which to form the waveguide layer.

Figure 9A:
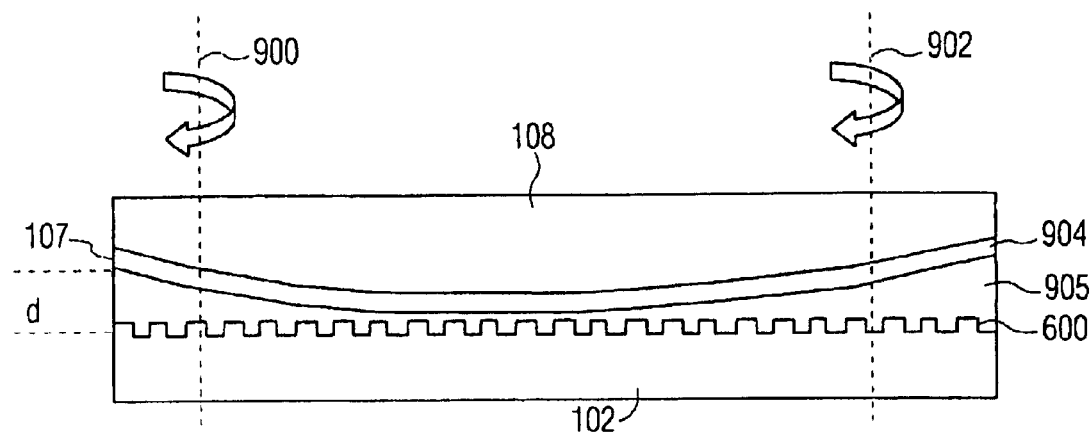
FIGS. 9A and 9B are side plan cut-away drawings of alternative exemplary GDC's fabricated using selective area growth (SAG) techniques for apodization.
Figure 9B:
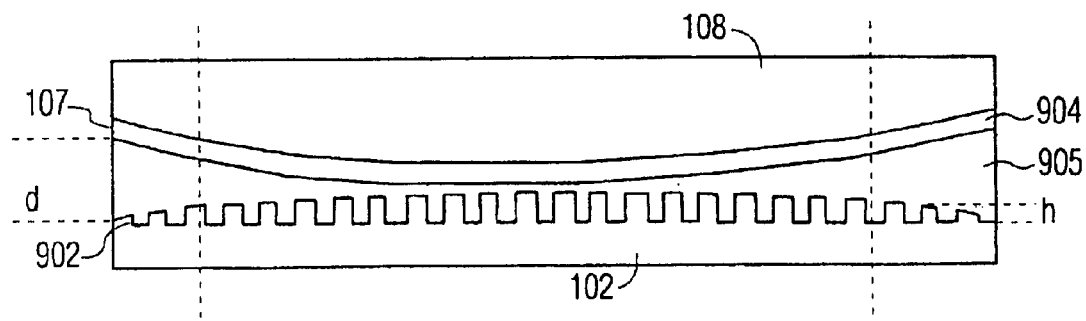

It may also be desirable to use SAG techniques, described above with respect to step 402, on the grating top layer to produce a variation in the thickness of the spacing layer to assist in apodization of the exemplary device. Exemplary GDC's including variable thickness spacing layer 905 are shown in FIGS. 9A and 9B. If SAG is used to form a variable thickness spacing layer, then the top grating layer may not be planarized.

Figure 7A:
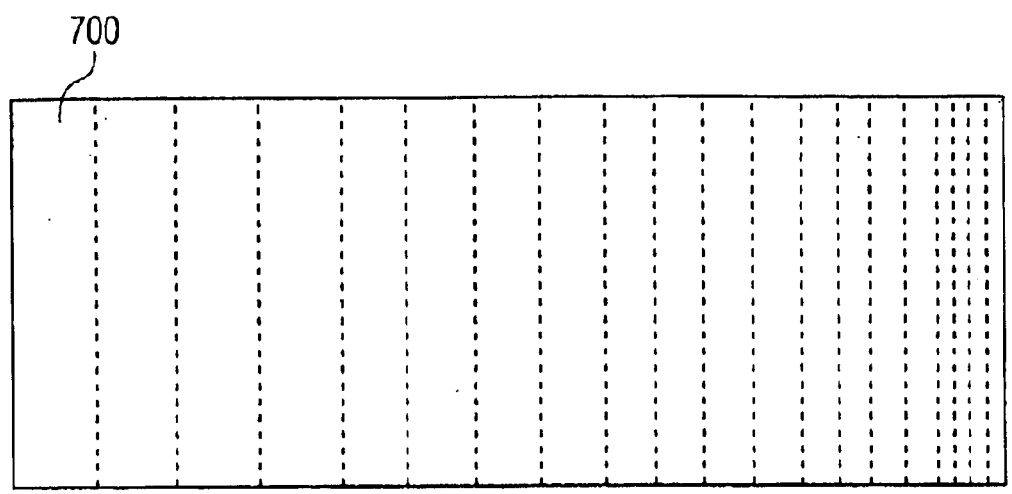
Figure 7B:
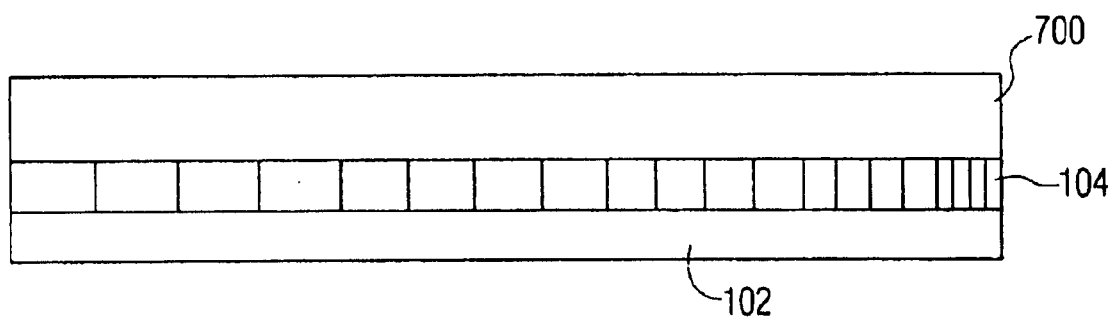
Figure 7C:
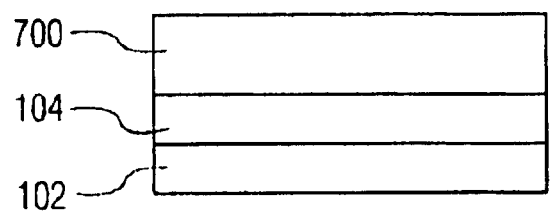

Once grating layer 104 is completed at step 406, waveguide layer 700 is formed over grating layer 104, preferably by an epitaxial growth technique, step 408. FIGS. 7A–C Illustrate the partially completed exemplary GDC following step 408. (If the thickness of grating layer 104 is varied using SAG, then waveguide layer 700 will be bowed.) Exemplary waveguide layer 700 is preferably formed of InGaAsP having an index of refraction higher than the refractive index of the grating top layer. Waveguide layer 700 may consist of a single layer of bulk material, a dual layer having one n-doped portion and one p-doped portion, as shown in FIG. 12B, or a plurality of layers forming a quantum well structure. A single layer of bulk material may be the waveguide layer type most easily grown. The dual layer may provide advantages for electrical tunability as described below with respect to FIG. 12B.

The growth of a quantum well structure in the waveguide layer may provide a waveguide that is more sensitive to electrical, temperature, and/or pressure variations. It is contemplated that this increased sensitivity may be exploited to increase the range, and possibly speed, of dynamic tunability which may be achieved in exemplary tunable GDC's, such as those shown in FIGS. 11, 12A, 12B, 13A, 13B, and 14A–C. Additionally, by using SAG, it is possible to grow a single multi-layer quantum well structure of varying thickness. Possible advantages of such a quantum well structure are described below with respect to FIG. 17.

Figure 11:
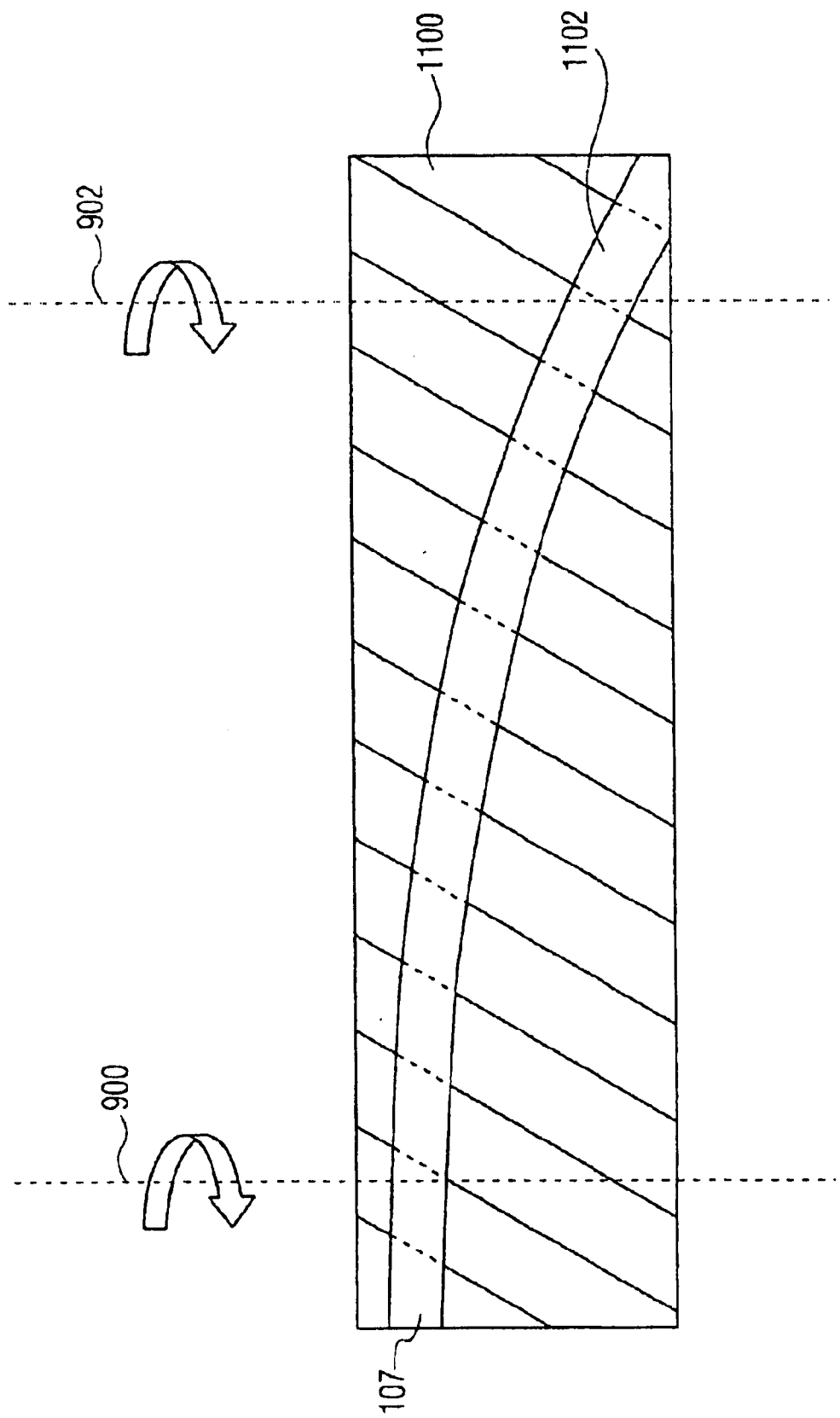
FIG. 11 is a top plan drawing of an alternative exemplary GDC including a curve waveguide.

Waveguide layer 700 is next defined and etched to form waveguide 106, step 410. Wet or dry etch techniques may be used. Alternatively, it may be desirable to first dry etch a structure slightly larger than the desired waveguide dimensions and then use a selective InGaAsP undercut etch to achieve the desired size for waveguide 106. This two part etching technique may provide a highly controllable method to form waveguide 106. As noted above, the cross-sectional shape and size of waveguide 106 may be important to minimize polarization modal dispersion. FIG. 11 illustrates curved waveguide 1102, which may be used to control the grating chirp of an exemplary GDC.

Figure 17:
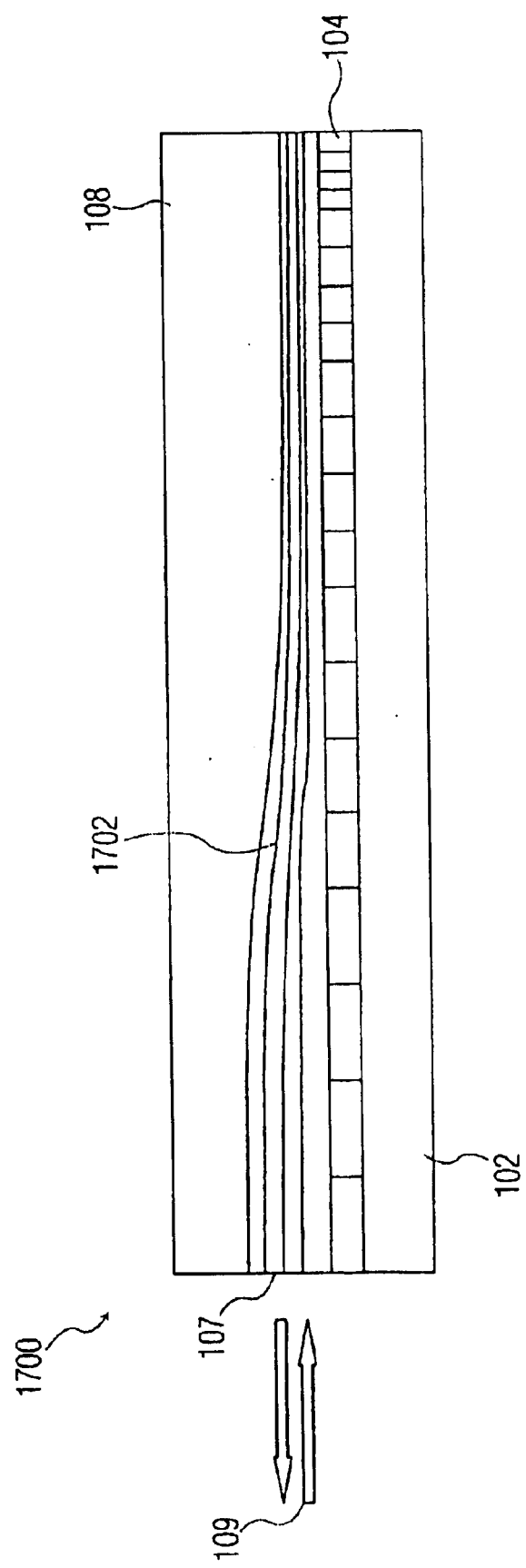
FIG. 17 is a side plan cut-away drawing of an exemplary GDC with a variable thickness quantum well waveguide.

Next passivation layer 108 is formed over waveguide 106, step 412. This step of the fabrication process is illustrated in FIGS. 8A–C. Preferably, passivation layer 108 is formed using the same method and material as the grating top layer. Passivation layer 108 desirably has a refractive index lower than waveguide 106, preferably similar to that of substrate 102 and the grating top layer, to act as a cladding layer and ensure light confinement within waveguide 106. Additionally, passivation layer 108 may be formed of a p-doped material, preferably InP or GaAs. Also, the passlvation layer may be formed in multiple sub-layers. If either grating layer 104 or waveguide 106 are formed using SAG it may be desirable to planarize passivation layer 108, as illustrated in FIGS. 9A, 9B, and 17.

Following step 412, FIG. 4 includes three alternative exemplary procedures which may be used to complete alternative exemplary embodiments of GDC's according to the present invention. The simplest of these alternative procedures is proceed directly to final step 414 and complete the exemplary GDC by forming waveguide I/O surface 107. This surface may be formed by any methods commonly used in semiconductor laser manufacture, such as cleaving the wafer in which the exemplary GDC has been formed to separate the device. Alternatively, an anti-reflection (AR) coating (not shown) may be deposited on I/O surface 107 to improve optical coupling of the device to other optical devices. This deposition may be accomplished by a number of methods known to those skilled in the art, such as e-beam evaporation, vapor phase deposition or sputtering. Static exemplary GDC's, such as those shown in FIGS. 1A and 1B, 8A–C, and 11 may be formed in this manner.

Two alternative procedures, also shown in FIG. 4, may be used to create exemplary dynamically tunable GDC's. These exemplary dynamically tunable GDC's may allow for dynamic tuning of both the center wavelength and the dispersion characteristics of the device across the wavelength band that is to be compensated. FIGS. 12A, 12B, and 14A–C illustrate exemplary dynamically tunable GDC's formed by the second alternative procedure. Following formation of passivation layer 108 electrical contacts on the passivation layer and/or substrate 102 at step 416.

Figure 12A:
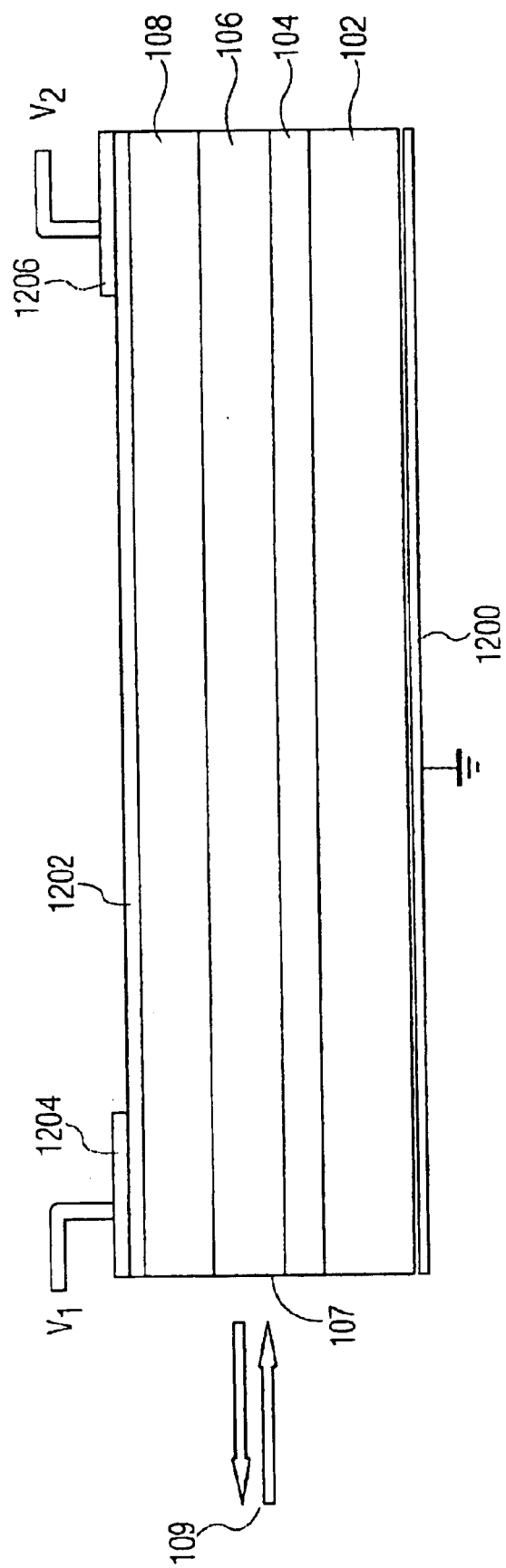
FIG. 12A is a side plan cut-away drawing of an exemplary current-controlled dynamically tunable GDC.
Figure 12B:
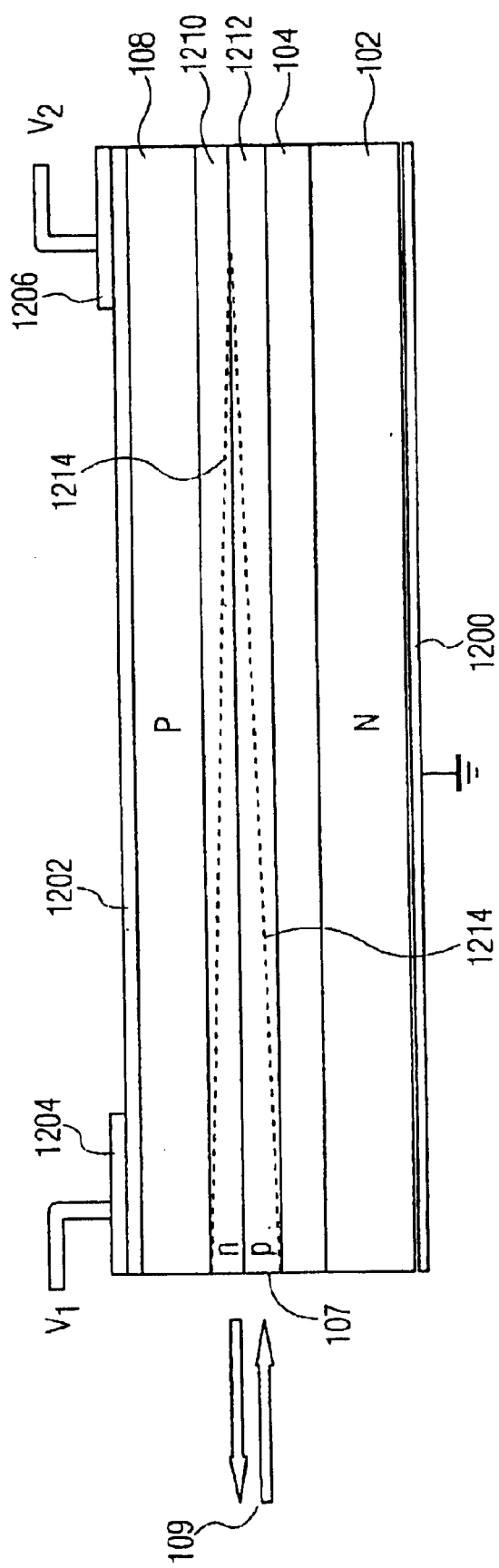
FIG. 12B is a side plan cut-away drawing of an exemplary voltage-controlled dynamically tunable GDC.

The electrical contacts formed on the electrically tunable exemplary GDC's of FIGS. 12A and 12B may include: substrate electrical contact 1200, coupled to substrate 102; resistive contact layer 1202, coupled to passivation layer 108; and first electrical contact 1204 and second electrical contact 1206 which may be coupled to resistive contact layer 1202 or passivation layer 108. It is noted that additional contacts similar to first contact 1204 and second contact 1206 may be connected along top of the device or substrate contact 1200 may be connected to voltages other than ground, as shown, and may be formed in several sections.

As shown in FIG. 14, electrical contacts 1400 maybe formed only on passivation layer 108 of the pressure tunable exemplary GDC.

These contacts may be formed using standard semiconductor fabrication techniques. The dynamically tunable exemplary dispersion compensating grating device is then completed by forming the waveguide I/O surface, step 414 as described above.

Figure 13A:
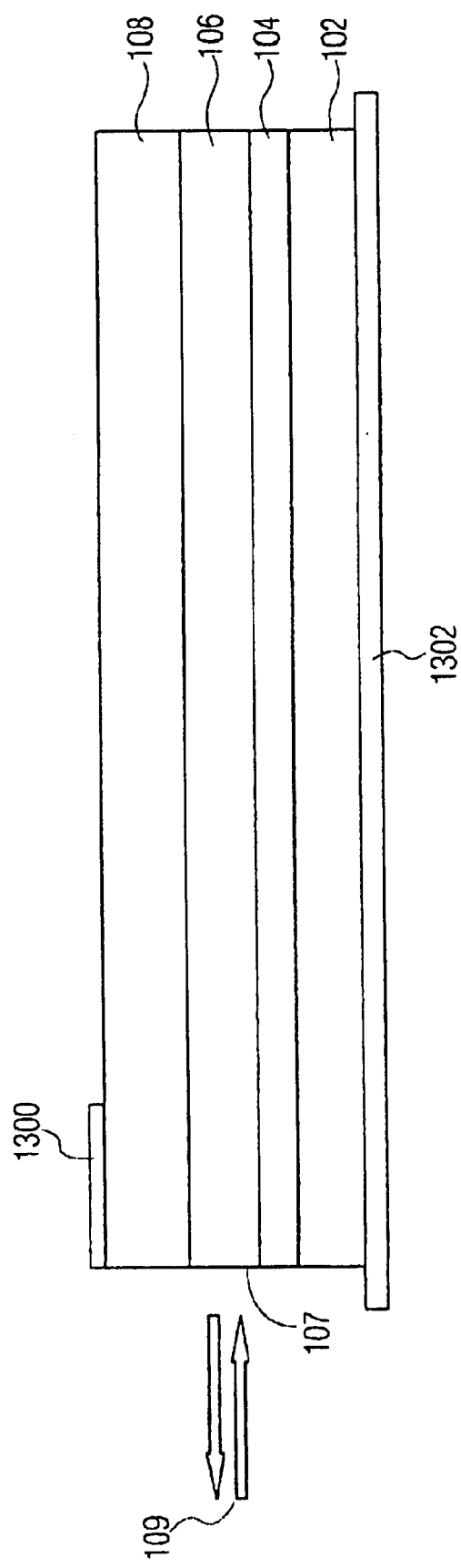
FIGS. 13A, and 13B are side plan cut-away drawings of exemplary temperature-controlled dynamically tunable GDC's.
Figure 13B:
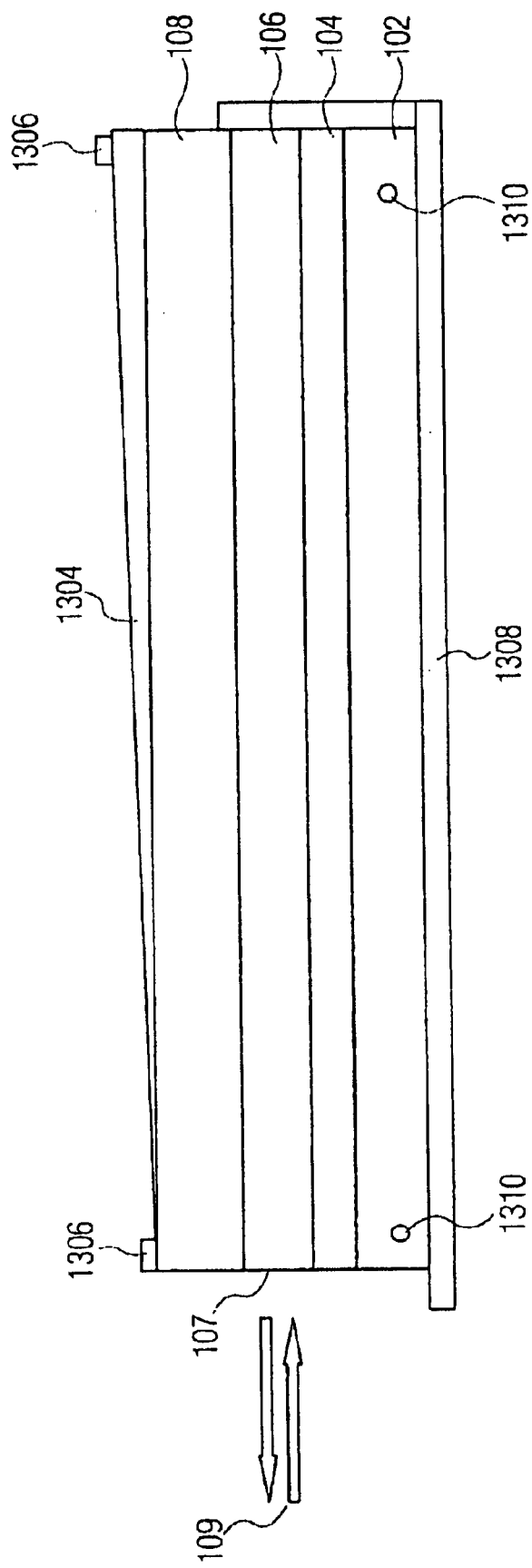
Figure 13C:
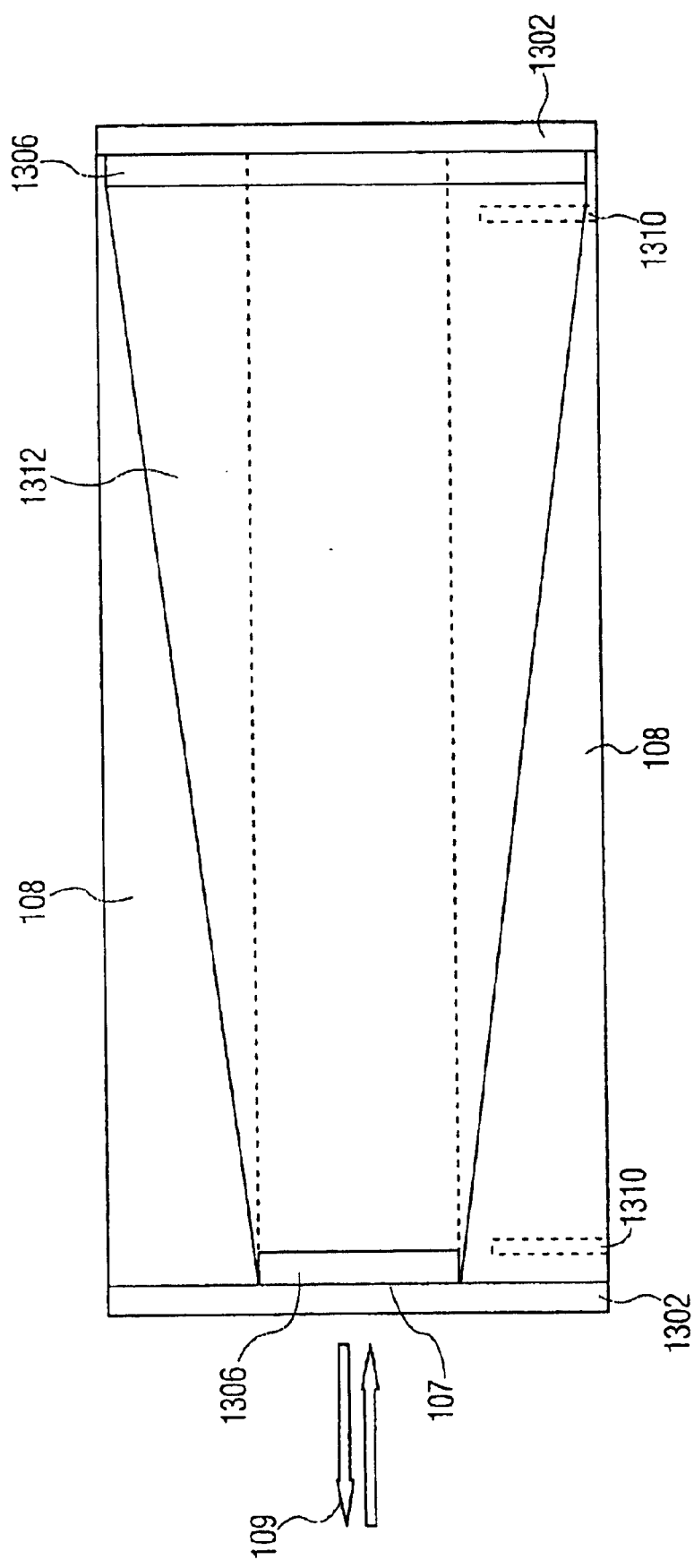
FIG. 13C is a top plan drawing of an exemplary temperature-controlled dynamically tunable GDC.
Figure 13D:
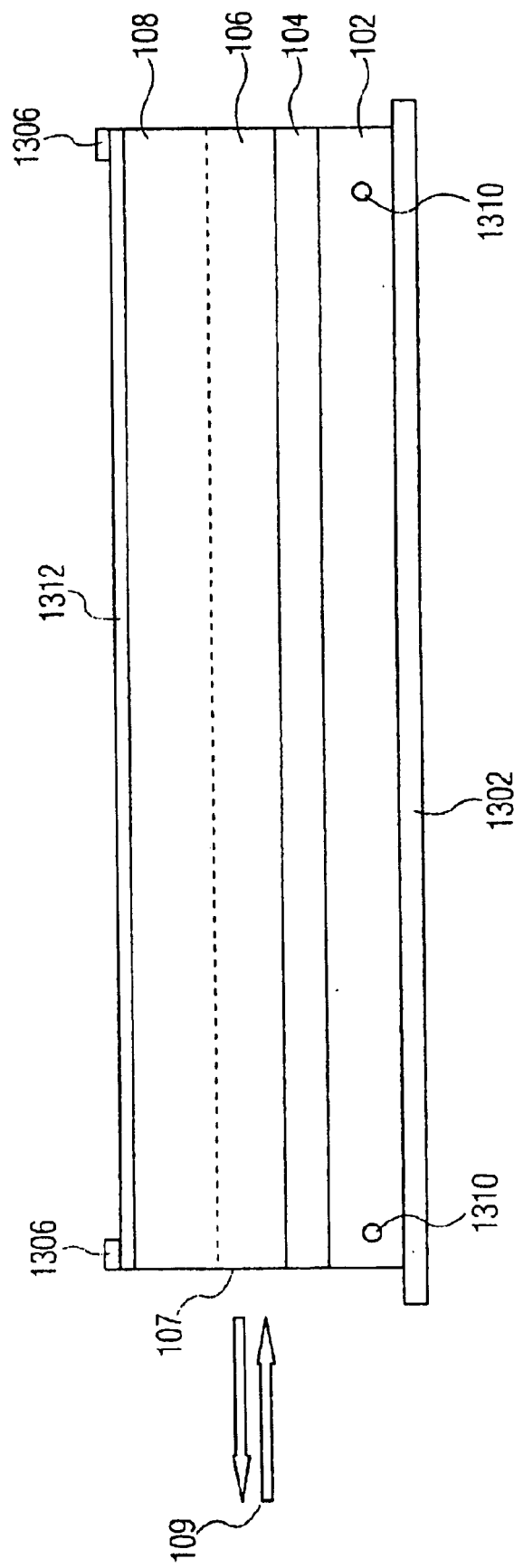
FIG. 13D is a side plan drawing of the exemplary temperature-controlled dynamically tunable GDC of FIG. 13C.

The final alternative exemplary procedure included in FIG. 4 may be used to create a temperature tunable exemplary dispersion compensating grating device, such as those shown in FIGS. 13A and 13B. Following formation of the passivation layer, step 412, a heating element is formed on the passivation layer, step 418. The heating element is preferably resistive heater composed of a metal, such as Al, Au, Cu, Ag, Ti, W, or an alloy, formed using a deposition technique, though it is contemplated that semiconductor resistive heaters or thermo-electric coolers may be used instead. FIG. 13A shows a single heating element 1300 located near the front of the exemplary temperature tunable GDC (i.e. the same side as I/O surface 107). Additional heating elements may be added to provide greater control over the temperature profile of the exemplary temperature tunable GDC. FIG. 13B shows graduated heating element 1304 with electrical contacts 1306 at either end of the exemplary GDC. FIGS. 13C and 13D illustrate alternative graduated heating element 1312. It is noted that, although graduated heating elements 1304 and 1312 are shown with linear gradients, other gradients are possible. Lithographic techniques to form complex width variations in graduated heating element 1312 may be used.

Next, heatsink 1302 is thermally coupled to substrate 102, step 420. The heatsink may also be coupled the back side of the exemplary temperature tunable GDC as shown in FIG. 13B. Preferably a pre-fabricated heatsink is attached to the temperature tunable GDC with thermally conductive epoxy, a layer of indium, or another standard method, but it is also contemplated that a heatsink may be formed by etching a metal layer deposited directly on the bottom surface of substrate 102.

This alternative exemplary procedure also ends with the formation of waveguide I/O surface 107. It is noted that step 420 may be performed during packaging of the exemplary temperature tunable GDC, after step 414.

Figure 18:
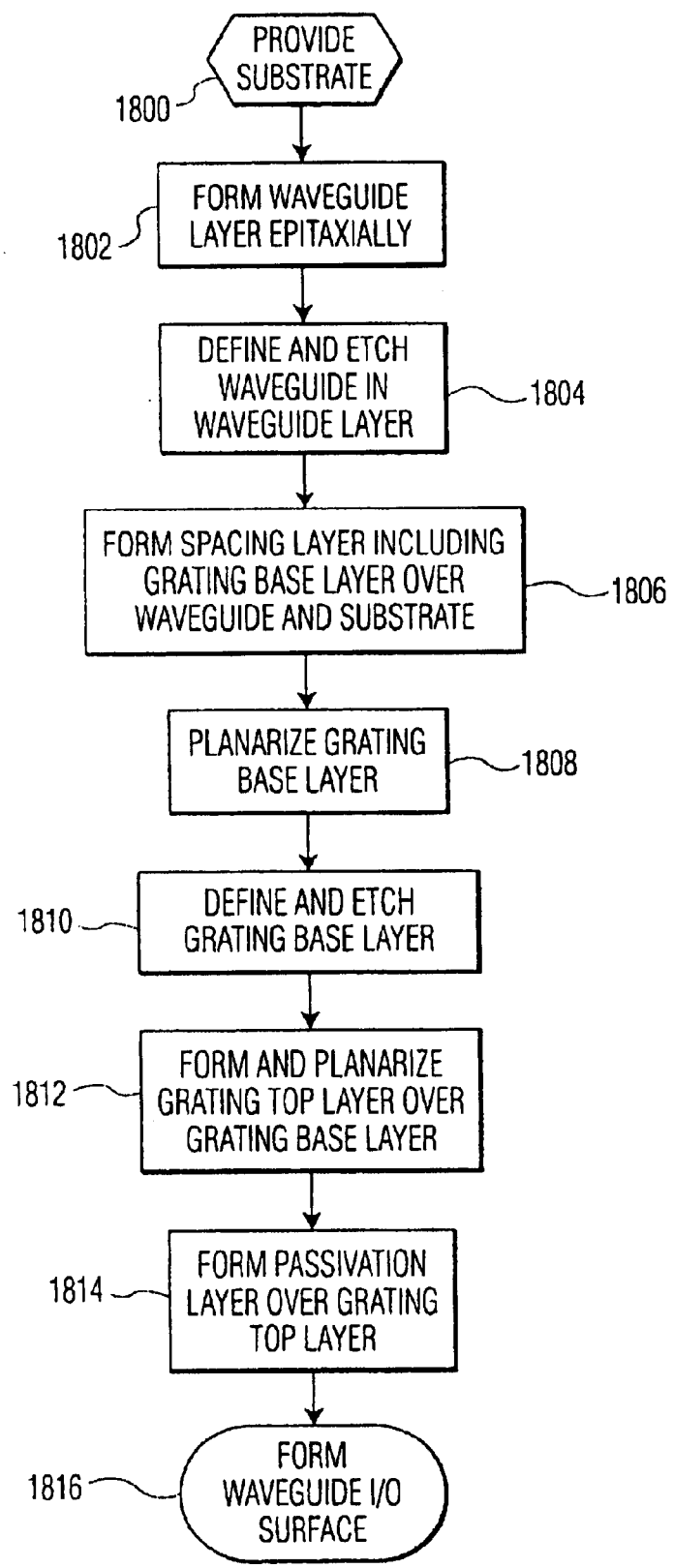
FIG. 18 is a flowchart illustrating alternative exemplary manufacture method of an exemplary GDC.

FIG. 18 is a flowchart describing an alternative exemplary technique for producing an exemplary GDC in which the optical grating is formed above the waveguide, rather than below it. FIGS. 19A–C, 20A–C, and 21A–C Illustrate various steps of this exemplary fabrication process. Many of the steps are the same as the steps of the exemplary method of FIG. 4. It is contemplated that the various alternative embodiments contemplated for exemplary GDC's produced based on the exemplary manhood of FIG. 4 may also be practiced for exemplary GDC's produce using the exemplary method of FIG. 18.

The process begins with a substrate, step 1800. Substrate 102, shown in FIGS. 19A–C, may function as both a cladding layer to assist in containment of the beam in the device and as the N layer of the P-I-N diode structure or may function as only a cladding layer. The substrate in this exemplary device is preferably formed of a III/V semiconductor, such as InP, GaAs, InGaAsP, InGaAs, or InAlGaAs. The substrate may also be formed of multiple layers such as GaAs grown on silicon or alumina.

First, the waveguide layer is formed over substrate 102, preferably by an epitaxial growth technique, step 1802. The waveguide layer is preferably formed of InGaAsP having an index of refraction higher than the refractive index of the substrate. The waveguide layer may consist of a single layer of bulk material, a dual layer of with one n-doped portion and one p-doped portion or a plurality of layers forming a single or multiple quantum well structure.

The waveguide layer is next defined and etched to form waveguide 106, step 1804. Wet or dry etch techniques may be used. Alternatively, as described above, it may be desirable to first dry etch a structure slightly larger than the desired waveguide dimensions and then use a selective InGaAsP undercut etch to achieve the desired size for waveguide 106. This two part etching technique may provide a highly controllable method to form waveguide 106.

Next, spacing layer 1900 which includes the grating base layer is grown, step 1806. MOCVD is the preferred method for deposition of this sub-layer, but other epitaxial deposition techniques may also be employed, such as MBE, CBE, and LPE. This layer is the base of the grating element and desirably is composed of InP with an index of refraction similar to that of the substrate. The top surface of spacing layer 1900 is planarized, step 1808, to prepare for etching the grating base layer.

Figure 19A:
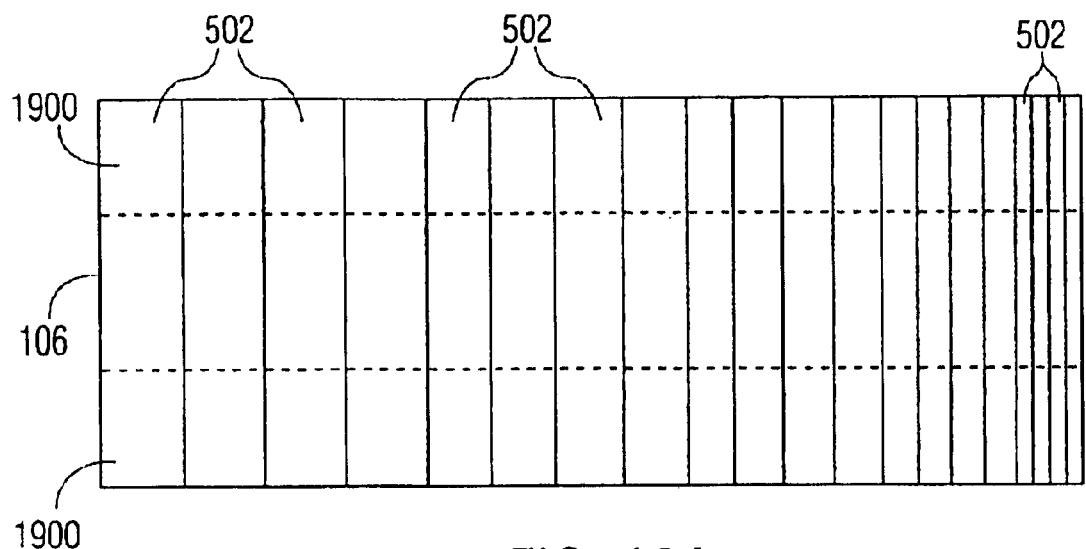
FIGS. 19A, 20A, and 21A are top plan drawings of an exemplary GDC during manufacture according to the flowchart of FIG. 18.
Figure 19B:
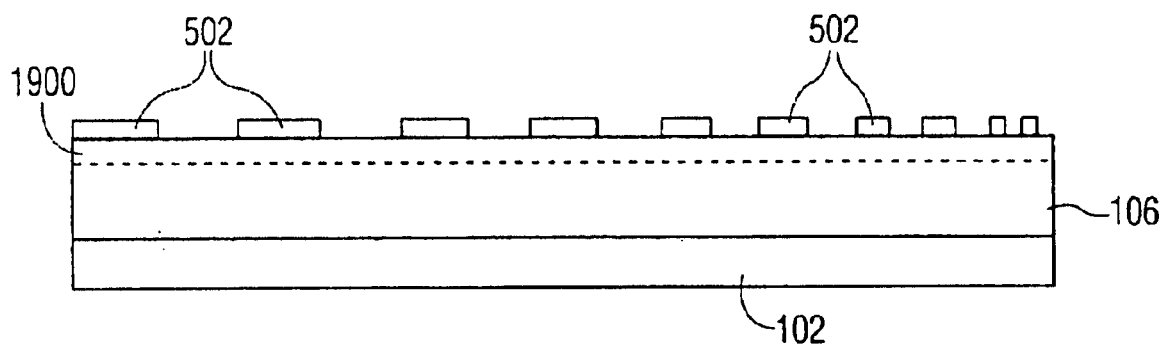
FIGS. 19B, 20B, and 21B are side plan drawings of an exemplary GDC during manufacture according to the flowchart of FIG. 18.
Figure 19C:
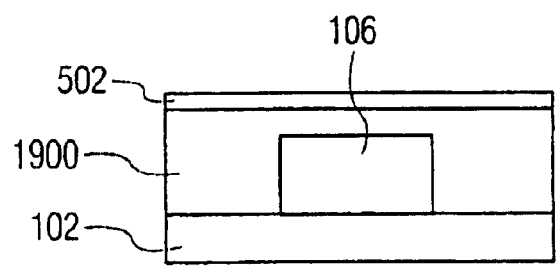
FIGS. 19C, 20C, and 21C are front plan drawings of an exemplary GDC during manufacture according to the flowchart of FIG. 18.
Figure 20A:
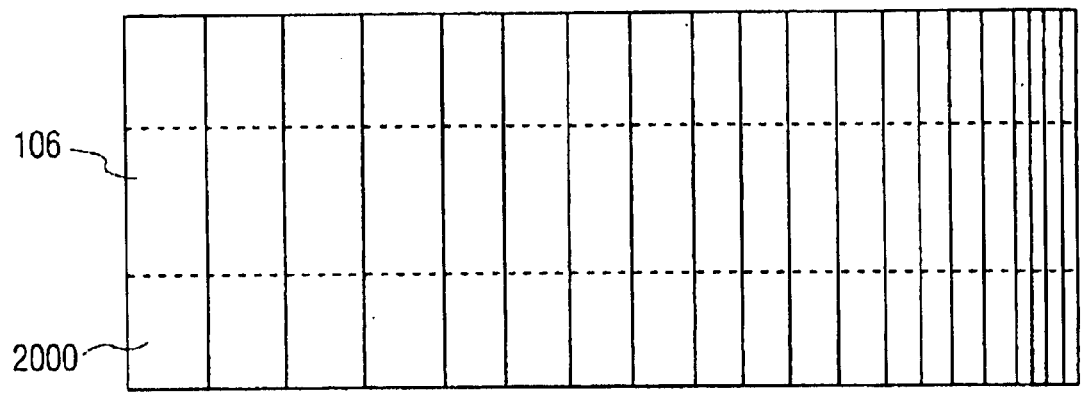
Figure 20B:
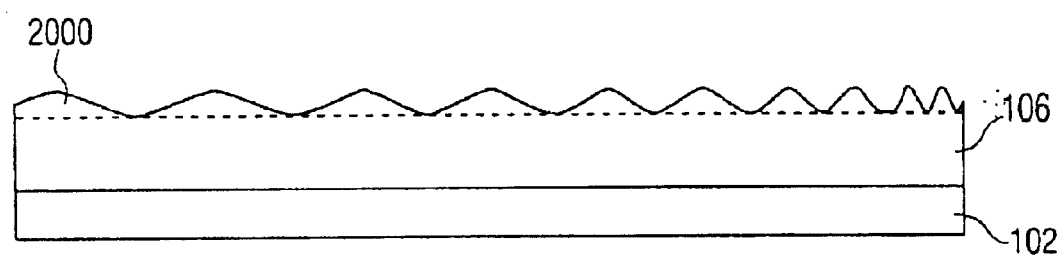
Figure 20C:
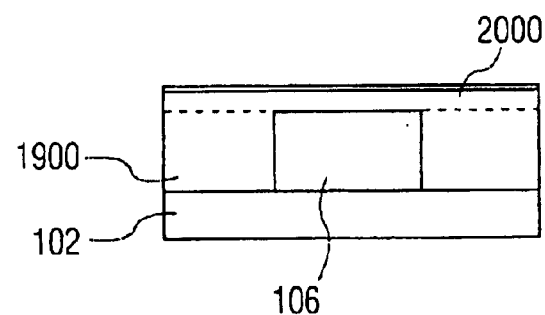

The grating base layer is defined and etched to form grating element 2000 in step 1810. A resist layer is applied on top of the grating base layer and patterned, as shown in FIGS. 19A–C. The pattern for this resist layer may be written using techniques such as e-beam lithography and holographic techniques, as described above.

The grating base layer is then etched, and the resist is removed forming grating element 2000, shown in FIG. 20. This etch procedure preferably uses a wet etch technique, but a dry etch or combination may be employed. A wet etch may provide less abrupt edges. FIGS. 19A–C illustrate the partially completed exemplary GDC following step 1810. A thin portion of spacing layer 1900 may desirably remain between waveguide 106 and grating element 2000.

Next, the grating top layer (not shown in FIGS. 20A–C), is formed over grating element 2000, and any exposed sections of the top surface of waveguide 106, step 1812. It may be preferable for the grating top layer to be formed of InGaAsP with an index of refraction between the indices of refraction of the waveguide and the spacing layer. This layer may be preferably formed using an epitaxial technique. The surface may then be planarized.

Next passivation layer 108 is formed over optical grating 104, step 1814. Preferably, passivation layer 108 is formed using the same method and material as spacing layer 1900. Passivation layer 108 desirably has a refractive index lower than that of waveguide 106, preferably similar to that of substrate 102 and spacing layer 1900, to act as a cladding layer and ensure light confinement within waveguide 106.

Figure 21A:
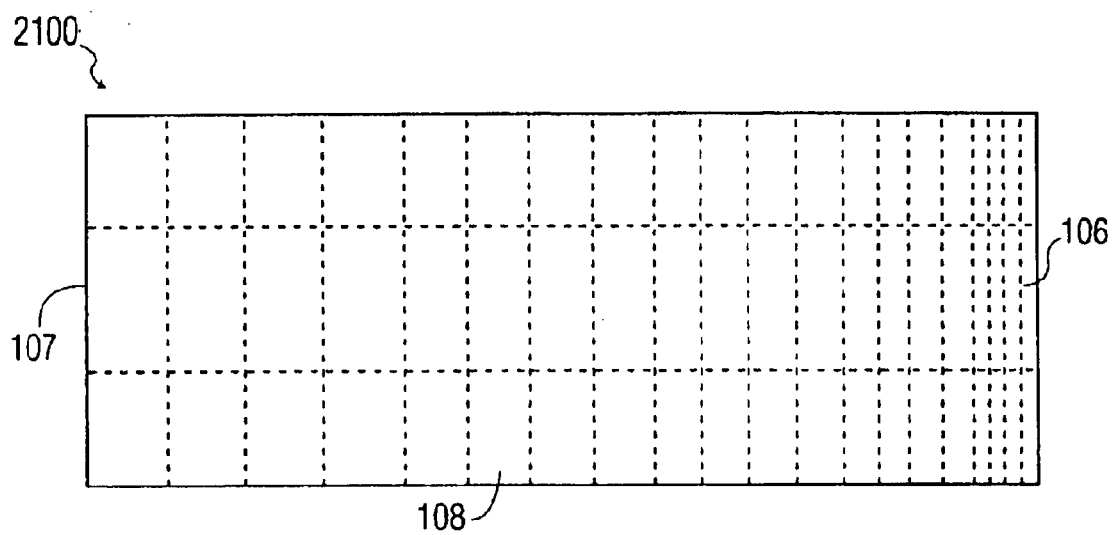
Figure 21B:
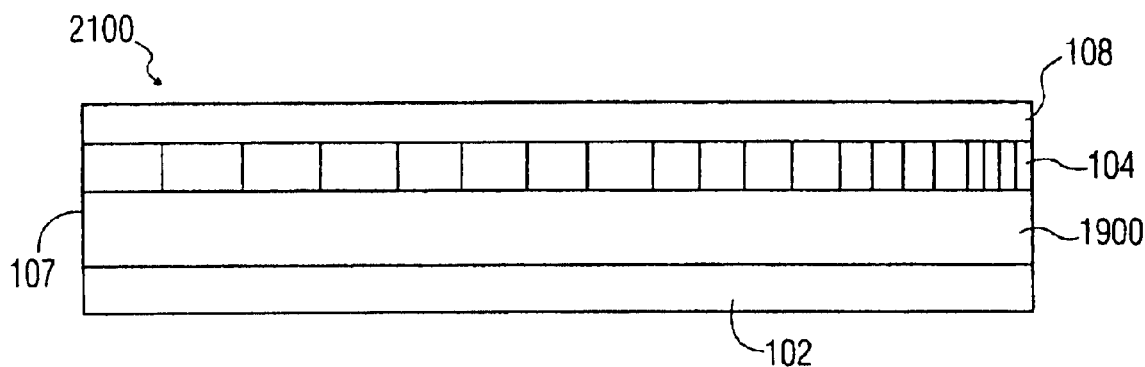
Figure 21C:
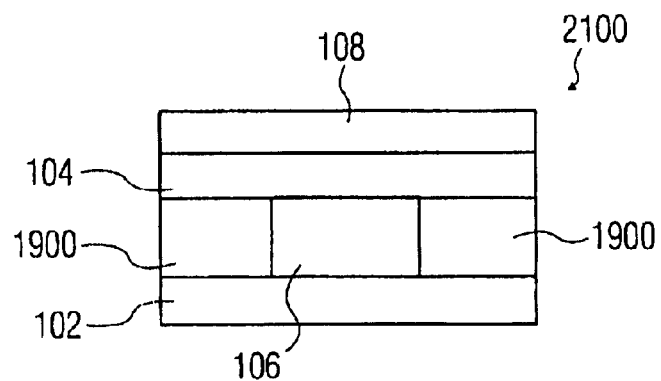

Exemplary GDC 2100, shown in FIGS. 21A–C, may be completed by forming waveguide I/O surface 107, step 1816. This surface may be formed by any methods commonly used in semiconductor laser manufacture, such as cleaving the wafer in which the exemplary GDC has been formed to separate the device. Alternatively, an anti-reflection coating may be deposited on I/O surface 107 improve optical coupling of the device to other optical devices. This deposition may be accomplished by a number of methods known to those skilled in the art, such as e-beam evaporation, vapor phase deposition or sputtering.

It is desirable that the interaction between the grating element and the optical signal travelling within the waveguide of an exemplary GDC decrease near the ends of the exemplary GDC. This apodization may be used to provide improved dispersion characteristics in the exemplary GDC. An exemplary apodization profile that may desirably be used is a super-Gaussian profile. Using this profile the interaction between the grating element and the optical signal is approximately zero at the front and back ends of the GDC waveguide. This interaction increases as a Gaussian toward the middle of the waveguide, but rather than peaking in a single position at the center, the super-Gaussian shape has an extended flat peak throughout the central portion of the waveguide FIGS. 9A, 9B, and 10 illustrate several exemplary apodization techniques that may be utilized in an exemplary GDC. FIGS. 9A and 9B are side plan views of an exemplary GDC and FIG. 10 is a top plan view of an exemplary GDC.

The apodization method illustrated in FIG. 9A involves varying the separation between waveguide 904 and grating element 600. The intensity of the optical signal tail within spacing layer 905 decreases rapidly with distance from the waveguide edge. Therefore, there is desirably very little interaction with the grating element near the ends of this exemplary GDC, i.e. outside of lines 900 and 902. Thickness variations of 3:1 within spacing layer 905 may provide a reasonable level of apodization, but variations of 5:1 may be preferable. It may be desirable for the central portion (between lines 900 and 902) of waveguide 904 to be relatively straight, but it may also be desirable for the maximum curvature of waveguide 904 to remain low so as to minimize any effects on waveguide performance. This may affect the total length of the exemplary GDC. The preferred method to accomplish the thickness variation of spacing layer 905 is through SAG during growth of this layer. Etching techniques may also be used.

FIG. 9B illustrates an alternative apodization technique for varying the thickness of grating element 906. Thinner grating element regions near the exemplary GDC ends provide less interaction with the optical signal. Although the exemplary GDC shown in FIG. 9B utilizes variation of the thickness of spacing layer 905 as well as variation of the thickness of grating element 906 for apodization, it is contemplated that sufficient apodization may be accomplished by varying the thickness of grating element 906 alone. As shown in FIG. 9B, it may be preferable to have grating element 906 narrowest at both ends of the exemplary device and thickest in the middle of the longitudinal axis, but it may also be desirable for the central portion of grating element 906 to be flat or even somewhat narrow. It may also be desirable for grating element 906 to be narrow only toward the end of the exemplary GDC, which includes I/O surface 107.

FIG. 10 illustrates a third exemplary apodization technique. This apodization technique reduces interaction between the optical signal and grating element 1000 by narrowing the grating element near the ends of the exemplary GDC. Although not necessary, it may be preferable to narrow grating element 1000 to zero width at the ends of the exemplary GDC, as shown in FIG. 10.

The three exemplary apodization techniques described above may be used individually or may be combined. All three techniques may be use with grating elements that have a constant longitudinal spacing or with grating element that have a variable longitudinal spacing as illustrated in FIGS. 1A, 1B, and 8A–C. Also, these techniques may be used with either the exemplary static GDC's or the exemplary dynamically tunable GDC's described above. It is noted that the chromatic dispersion of exemplary apodized GDC's may be designed such that the desired wavelength band is reflected between line 900 and line 902, shown in FIG. 9, to maintain a relatively constant effective reflectivity throughout the band. This may also reduce the amount of apodization desired at the back end of the exemplary apodized GDC due to the desirably low amount of light transmitted past line 902.

FIG. 11 illustrates an alternative exemplary method of providing the grating chirp in a GDC. The exemplary embodiment in FIG. 11 uses curved waveguide 1102 and angled optical grating 1100 to vary the effective period of the grating element along the, curved, longitudinal axis of the waveguide. The specific shape of curved waveguide 1102, and hence the effective chirp of this exemplary GDC, may be controlled with great precision. Maximum curvature of the waveguide may be limited by polarization modal dispersion between the TE and TM mode of the waveguide. Angled optical grating 1100 may also be formed with a chirped period to allow greater chromatic dispersion and possibly additional control of the effective chirp, or it may be formed to have a constant period, as shown in FIG. 11. An exemplary GDC design incorporating a curved waveguide and an angled grating element with a constant period may be more easily fabricated than an exemplary GDC with a straight waveguide and a chirped optical grating.

FIG. 17 illustrates exemplary GDC 1700 in which quantum well waveguide 1702 includes a quantum well structure of varying thickness. It is also noted that the bandgap, and hence the cutoff wavelength, of a quantum well structure depends, among other factors, on the thickness of the multiple layers within the quantum well structure. Near the cutoff wavelength the index of refraction varies significantly as a function of wavelength. According to the Kramers-Kronig relationship, if the cutoff wavelength is varied, then there is also a variation in the wavelength dependence of the index of refraction. Therefore, using SAG, it is possible to design a GDC in which the index of refraction for a range of wavelengths varies in a predictable manner along the longitudinal axis of quantum well waveguide 1702 by varying the thickness of the quantum well layers forming waveguide 1702.

The period of optical grating element 104 experienced by optical signal 109 depends on the effective index of refraction, $n_{eff}$, of the GDC. The value of $n_{eff}$ is perturbed slightly by the indices of refraction of optical grating element 104 and passivation layer 108, but is largely determined by the index of refraction of quantum well waveguide 1702. This allows wavelength dependent chirp of the dispersion curve of exemplary GDC 1700 to be controlled by varying the thickness of quantum well waveguide 1702. It is contemplated that the period optical grating element 104 may be constant, or may be chirped. It is also contemplated that quantum well waveguide 1702 may be curved in the same way as curved waveguide 1102 in FIG. 11.

The quantum wells and barriers of quantum well waveguide 1702 are preferably $In_xGa_{(1-x)}As_yP_{(1-y)}$ materials as well as $In_xAl_yGa_{(1-x)}As_{(1-y)}$ and $In_xGa_{(1-x)}As$ materials. Specific selections of x and y are dependent on the desired bandgap and strain, if any, desired. These sub-layers may also be formed by other permutations of alloys formed from these elements.

Static GDC's are passive optical devices and, therefore, have no power consumption and require very minimal maintenance once they are installed. Dynamically tunable GDC's, however, may offer a number of advantages over static GDC's. Dynamically tunable GDC's may be designed to provide dynamic tuning of the center wavelength, or they may be designed to provide dynamic tuning of the dispersion characteristics of the device across the wavelength band desired to be compensated, or both.

This means that a dynamically tunable GDC may provide superior performance by tracking shifts in the optical wavelength due to age or environmental conditions. A common use for dispersion compensation elements is to compensate for the broadening of signal pulse due to chromatic dispersion from transmission over long-haul optical fibers, or from non-linear optical media in various optical devices. The shape, and magnitude, of the chromatic dispersion curve is dependent on a number of parameters, such as the length of the optical fiber, specific to each application. It is impractical to produce a static GDC for each individual use. One solution may be to produce standard sized static GDC's, generally with linear dispersion curves, and selected the closest one. With a dynamically tunable GDC, the dispersion characteristics may also be tuned during installation, or operation, to optimize performance in the specific application the dynamically tunable GDC is used in. Also, changes in the system configuration, such as adding a kilometer of optical fiber or a new semiconductor optical amplifier (SOA), may be compensated by changing the tuning of the dynamically tunable GDC.

FIGS. 12A, 12B, 13A, 13B, and 14A–C illustrate several exemplary dynamically tunable GDC's. These devices are preferably operated by dynamically varying $n_{eff}$ of the waveguide, and thus the effective optical period of the optical grating. A small change in the actual period of the optical grating due to thermal expansion, piezoelectric, and/or electrostriction effects may also occur. These devices may be designed with optical grating elements having a constant period and the dispersion chirp desirably added by varying $n_{eff}$ along the longitudinal axis of the waveguide. The center wavelength may also be fine-tuned. Alternatively, the actual optical grating period may be chirped, or a curved waveguide as shown in FIG. 11 may be used, and the tuning applied for fine-tuning of the center wavelength and/or dispersion curve. Additionally, it is contemplated that an exemplary dynamically tunable GDC may be tuned using combinations of these exemplary methods, such using both electrical and thermal effects, to control $n_{eff}$ of the waveguide. An exemplary GDC using a combination of effects may have advantages due to differences in how each method effects the wavelength dependence of the index of refraction. Near an absorption peak the chromatic dispersion of $n_{eff}$ may be significant.

Quantum well structures, including variable thickness quantum well structures such as those of quantum well waveguide 1702 of FIG. 17, may be desirable for the waveguide of an exemplary dynamically tunable GDC due to the increased sensitivity of these structures.

FIG. 12A illustrates an exemplary current-controlled GDC. Changes in carrier density may be used to alter the bandgap and, hence, the index of refraction of semiconductor materials. Therefore, the $n_{eff}$ of waveguide 106 may be varied by passing a current between resistive contact layer 1202, which preferably has a significantly lower electrical resistance than passivation layer 108, and substrate electrode 1200. The amount of current flow at various positions along the longitudinal axis of the exemplary GDC may be controlled by the voltages placed on first electrode 1204 and second electrode 1206. A shift in the center wavelength may be accomplished by varying the voltage in both first electrode 1204 and second electrode 1206 equally. A longitudinal variation in current density, leading to changes in the shape of the dispersion curve, may be accomplished by varying the voltage of first electrode 1204 and second electrode 1206 relative to one another. It is contemplated that the current may flow in either direction.

The longitudinal variation in current density may also be manipulated by varying the thickness, and in turn the voltage of distribution, of resistive contact layer 1202. It is noted that resistive contact layer 1202 may also be omitted and the longitudinal spread of the current density may occur substantially in passivation layer 108. It is also noted that the choice to couple two electrodes to the top side of the exemplary current tunable GDC is merely illustrative. A greater number of electrodes may allow more sensitive control of the dispersion curve. Alternatively, it may be desirable to include only one electrode and to have the longitudinal current density distribution determined by the linear resistivity of resistive contact layer 1202 or the other layers of the exemplary current tunable GDC. Although, waveguide 106 may be a single layer bulk semiconductor material, it is contemplated that it may be desirable for waveguide 106 to be a dual layer material formed with a p-doped layer and an n-doped layer operating like a forward-biased diode junction, or a quantum well structure.

FIG. 12B illustrates an exemplary voltage-controlled GDC. This exemplary type of dynamically tunable GDC is very similar to the current-controlled GDC described above with respect to FIG. 12A. The major difference is the use of a dual layer waveguide structure composed of n-doped layer 1210 and p-doped layer 1212 as a reverse biased diode junction. (It may also be desirable that passivation layer 108 and substrate are p-doped and n-doped, respectively.) A reverse biased quantum well structure may also be employed. The intended effect of the reverse-biased junction is to limit current flow and, thereby, reduce power consumption. The variation in $n_{eff}$ is accomplished by controlling the carrier depletion region of doped layer 1210 and 1212. One possible depletion region profile is outlined by dashed lines 1214. The Franz-Keldysh effect may also play a role in varying $n_{eff}$ in this exemplary voltage-controlled GDC.

FIGS. 13A and 13B illustrate alternative exemplary embodiments for temperature controlled GDC's. The relatively simple embodiment in FIG. 13A uses heating element 1300 and heat sink 1302 to create a temperature gradient within waveguide 106. This temperature gradient may be used to create a longitudinal variation in $n_{eff}$. The temperature dependence of bulk InGaAsP is approximately $1.9 \times 10^{-4} K^{-1}$. Therefore, a temperature gradient of 100° C. between I/O surface 107 and the back end of the exemplary GDC may change $n_{eff}$ on the order of 1%. A 1% change in $n_{eff}$ may cause significant dispersion, even if optical grating element 104 has a constant period. Greater thermal sensitivity may be possible in temperature-controlled quantum well waveguide structures.

A longitudinally uniform change in temperature along the waveguide may have the effect of shifting the center wavelength of the GDC.

Heating element 1300 may be a thin film of deposited metal, which may only raise the temperature of the GDC above the ambient temperature through resistive heating, or it may be one or more thermo-electric coolers capable of raising and/or lowering the temperature as desired. In this relatively simple embodiment, it may be desirable to change to overall temperature of the GDC significantly from the ambient temperature to lower effects due to changes in the ambient temperature.

Finer control of the temperature gradient profile may be attained by the addition of further heating or cooling elements. Temperature sensors 1310, as shown in FIG. 13B, may be added to the embodiment of FIG. 13A to increase the precision and stability of temperature control by utilizing feedback control techniques. Also, heatsink 1302 may be moved and coupled to the back surface of the exemplary GDC in FIG. 13A (or extended to cover the back surface in addition to the bottom surface as is shown for alternative heatsink 1308 in FIG. 13B). Such an alternative heatsink configuration may reduce the heat necessary to create the temperature gradient along the longitudinal axis.

The alternative exemplary temperature controlled GDC embodiment shown in FIG. 13B includes graduated heating element 1304 with electrical contacts 1306, temperature sensors 1310, and alternative heatsink 1308. Graduated heating element 1304 is preferably formed of a deposited metal film. By varying the thickness of this metal film along the longitudinal axis of the GDC, the linear resistivity of graduated heating element 1304 may also be varied along the longitudinal axis. The linear current density remains constant. Therefore, according to Ohm's law, the voltage drop varies with the resistance. Because the resistive heating of this element is equal to the current times the voltage drop, the amount of heat conducted into the passivation layer varies with the profile of the graduated heating element. The graduated heating element profile may be designed to provide a linear or a non-linear dispersion curve, as desired. Graduated heating element 1304 may even be flat to provide a constant temperature profile. Also, it is noted that alternative heatsink 1308 may be replaced with heatsink 1302 shown in FIG. 13A.

FIGS. 13C and 13D illustrate an alternative embodiment of a thermally controlled GDC, similar to the exemplary embodiment of FIG. 13B. The exemplary embodiment of FIGS. 13C and 13D includes alternative graduated heating element 1312. Alternative graduated heating element 1312 is preferably formed of a deposited metal film. By varying the width of this metal film along the longitudinal axis of the GDC, the linear resistivity of, and heat produced by, alternative graduated heating element 1312 may be varied along the longitudinal axis. The graduated heating element width may be varied to provide a linear or a non-linear dispersion curve, as desired. Graduated heating element 1312 may also be rectangular to provide a constant temperature profile.

Although FIG. 13B shows a single graduated heating element 1304 extending over the entire length of the top surface of passivation layer 108, it is contemplated that graduated heating element 1304 may extend over only a portion of the top surface of passivation layer 108. It is also contemplated that alternative graduated heating element 1312 may extend over less than the full length of passivation layer 108. If the graduated heating element covers less than the whole top surface of passivation layer 108, then more than one graduated heating element may be used and the multiple graduated heating elements may have different linear resistivity profiles as well. Alternatively, both the thickness and width of a graduated heating element may be varied to create a desired temperature profile. The number and position of temperature sensors 1310 may be changed as well. Utilizing these alternative embodiments, greater tunability, or more complex dispersion characteristics, may be attained.

FIGS. 14A–C illustrate an exemplary pressure tunable GDC. In this exemplary embodiment $n_{eff}$ of the GDC is tuned using pressure on waveguide 106 passivation layer 108 is formed of a piezoelectric material, such as quartz, rochelle salt, potassium dihydrogen phosphate, and ammonium dihydrogen phosphate. Pressure may be generated by selective piezoelectric expansion, or contraction, of passivation layer 108 using electrodes 1400. This exemplary piezoelectric expansion, or contraction, is illustrated by arrows 1402. Voltages may be placed on the various electrodes 1400 to create a specific dispersion curve. It is noted that the choice of 16 electrodes is merely illustrative.

Alternatively, waveguide 106 may be formed of a piezoelectric material, or only a sub-layer of piezoelectric may be formed within the passivation layer to craft the pressure due to expansion, or contraction.

It is also contemplated that electrodes 1400 may be configured to provide substantially vertical, rather than substantially horizontal, pressure on waveguide 106. This alternative method of pressure tuning $n_{eff}$ may be particularly effective for waveguides with quantum well structures. A small change in the thickness of the quantum well layers may significantly change the bandgap of such a structure. Shifting the bandgap effects both the absorption spectrum of the structure, but based on the Kramers-Kronig relationship the wavelength dependent index of refraction as well.

Figure 15:
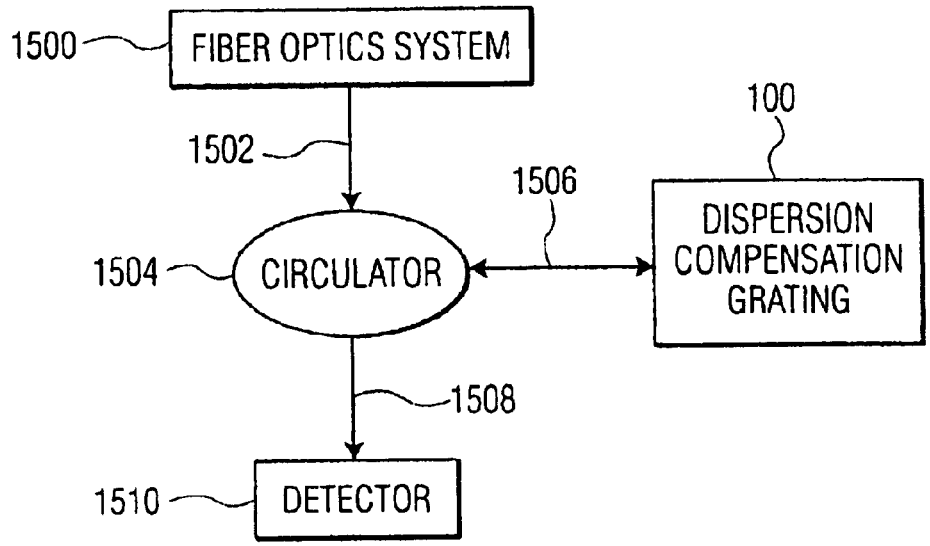
FIG. 15 is a block diagram illustrating an exemplary optical communications detection system including a GDC.

One exemplary use of a GDC is shown in FIG. 15. The signal pulses of an optical signal transmitted within fiber optics system 1500 may be significantly broadened due to chromatic dispersion during transmission. This chromatic dispersion may result from transmission in optical fibers or may result from interaction with optical components such as EAM's, SOA's, or VOA's that may be included in fiber optics system 1500. The broadened signal pulses may become difficult for detector 1510 to distinguish. Therefore, it may be desirable to recompress the signal pulses by reversing the chromatic dispersion of the signal using GDC 100 before detection.

The broadened optical signal is coupled from fiber optics system 1500 into circulator 1504 via optical coupler 1502. Circulator 1504 routes the broadened optical signal through I/O coupler 1506 and into GDC 100. The optical signal is substantially recompressed in GDC 100 and reflected back into I/O coupler 1506. Circulator 1504 routes the recompressed optical signal into detector 1510 through optical coupler 1508. I/O coupler 1506 and optical couplers 1502 and 1508 may include optical fibers, planar waveguides, and/or lens systems.

Circulator 1504, I/O coupler 1506, and GDC 100 may be formed together as a monolithic dispersion compensation optical chip. Additionally, optical coupler 1508 and detector 1510 may be added to the optical chip to form a monolithic, dispersion compensated, optical signal detector.

Figure 16:
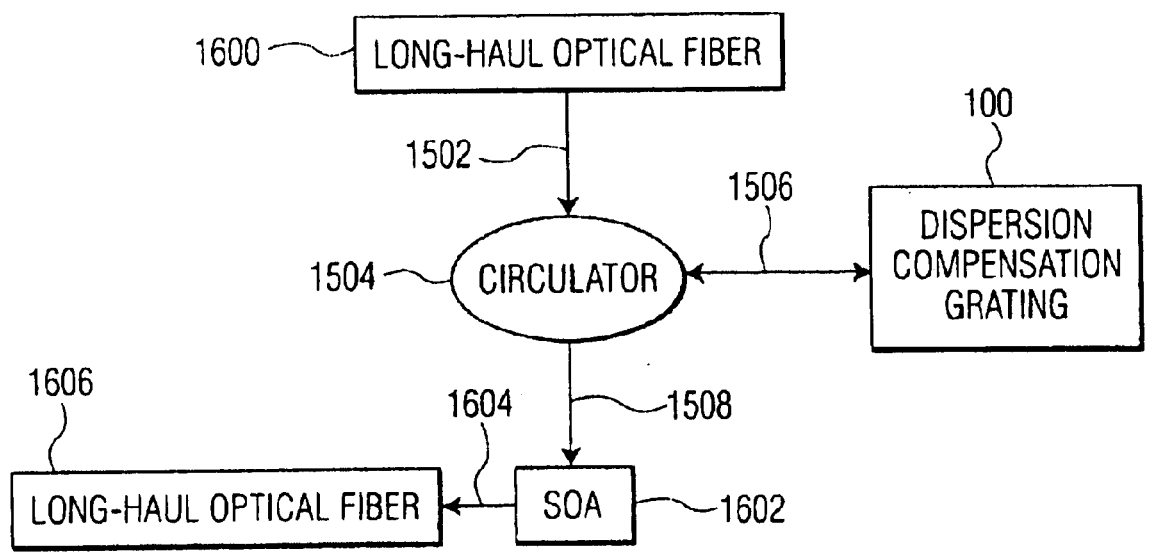
FIG. 16 is a block diagram illustrating an exemplary extended range optical communications system including a GDC.

The range over which an optical signal can be transmitted in such a system is limited by losses as well as pulse broadening within long-haul optical fibers. One solution is to detect the signal before it becomes undetectable and then retransmit the signal. This slows the overall transmission speed of the system and may introduce errors. FIG. 16 illustrates an exemplary extended range fiber optic communication system, which employs SOA 1602, to extend the range between retransmissions.

The broadened optical signal is coupled from long-haul optical fiber 1600 into circulator 1504 via optical coupler 1502. As in the detector system of FIG. 15, circulator 1504 routes the broadened optical signal through I/O coupler 1506 and into GDC 100. The optical signal is substantially recompressed in GDC 100 and reflected back into I/O coupler 1506. Circulator 1504 routes the recompressed optical signal into SOA 1602 through optical coupler 1508. The recompressed and amplified signal is the coupled, through optical coupler 1604, into another long-haul optical fiber 1606 to continue its transit.

As an alternative embodiment, it may be desirable to place SOA 1602 before circulator 1504. This embodiment may allow chromatic dispersion which may be introduced by SOA 1602 to be compensated by GDC 100, as well as chromatic dispersion from long-haul optical fiber 1600. If the pulse broadening is too great, SOA 1600 not be able to operate efficiently in this configuration.

Another alternative embodiment of the exemplary extended range fiber optic communication system of FIG. 16 involves placing SOA 1602 between circulator 1504 and GDC 100. This configuration allows the signal to pass through SOA 1602 twice, providing additional amplification for the optical signal. GDC 100 and SOA 1602 may be formed in this configuration as a single monolithic dispersion compensating amplifier chip, as shown in FIGS. 22A and 22B.

Figure 22A:
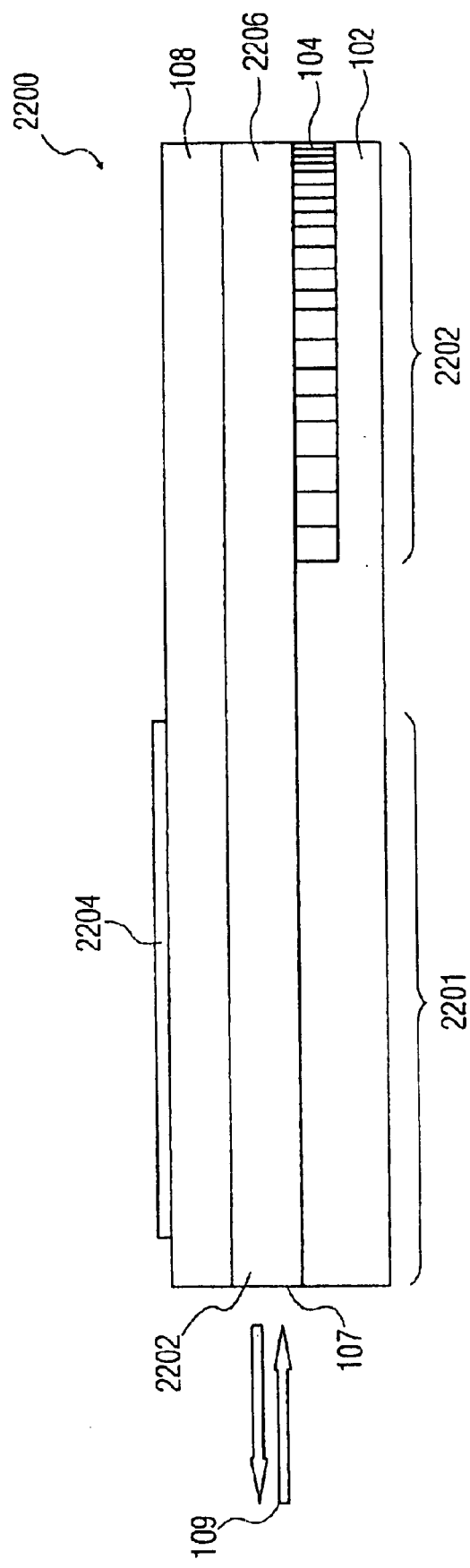
FIG. 22A is a side plan drawing of an exemplary monolithic optical chip including a GDC.

FIGS. 22A and 22B illustrates an exemplary monolithic optical chip in which transmissive planar waveguide optical component 2201 is integrated with GDC 2200 in a single optical chip. GDC 2200, which includes a portion of substrate 102, optical grating 104, GDC waveguide 2206, and a portion of passivation layer 108, may be formed using any of the previously described embodiments.

Transmissive planar waveguide optical component 2201 may be a passive optical element, such as a circulator, or may be an active optical element, such as a variable optical attenuation (VOA), an electro-absorption modulator (EAM), or an SOA, as shown in FIGS. 22A and 22B. If transmissive planar waveguide optical component 2201 is a circulator, then monolithic optical chip 2200 may be formed with both an input surface and an output surface in the front portion of the chip. Alternatively, both a circulator and an active optical element may be included in an exemplary monolithic optical chip. In this alternative exemplary embodiment, the planar waveguide of the active optical element may be formed between the circulator and the GDC, or between the circulator and either the input surface or the output surface of the exemplary monolithic optical chip.

The active optical element 2201 of exemplary monolithic optical chip shown in FIGS. 22A and 22B includes a portion of substrate 102, active waveguide layer 2202, a portion of passivation layer 108 and top electrode 2204. Active waveguide layer 2202 may a bulk material, or may be a quantum well structure. It may be desirable for active waveguide layer 2202 and GDC waveguide 2206 to be formed as a single layer to reduce possible boundary scattering. Therefore, if active waveguide layer 2202 is formed as a quantum well structure, it may be preferable for GDC waveguide 2206 to be formed to include the same quantum well sub-layers as well.

Performance of quantum well structures in both GDC's and active optical elements, such as SOA's and VOA's, may be greatly affected by the thickness of the sub-layers of the quantum well structure. SAG may be used to produce a quantum well structure in active waveguide layer 2202 that has a different thickness than in GDC waveguide 2206. By producing different thicknesses for active waveguide layer 2202 and GDC waveguide 2206, each portion of the waveguide may be optimized. The waveguide portion between active waveguide layer 2202 and GDC waveguide 2206 may be gradually changed to allow adiabatic expansion and contraction of the optical signal modes, reducing any possible loss.

Although the embodiments of the invention described above have been mostly in terms of GDC's formed in III/V materials and with the optical grating formed beneath the waveguide, it is contemplated that similar concepts may be practiced with other dielectric materials, or may be practiced with the optical grating formed on top of the waveguide. Also, it will be understood to one skilled in the art that a number of other modifications exist which do not deviate from the scope of the present invention as defined by the appended claims.

What is claimed:

1. A method of manufacturing a grating dispersion compensator, comprising the steps of:
   a) providing a substrate having a substrate index of refraction;
   b) forming a grating layer base on the substrate having a grating base index of refraction greater than the substrate index of refraction on a portion of the top surface of the substrate;
   c) defining and etching a grating pattern in the grating layer base;
   d) forming a grating top layer having a grating top index of refraction less than the grating base index of refraction over the etched grating layer base such that the grating top layer and the grating layer base form a dielectric grating layer having an index of refraction that changes to define at least one grating period;
   e) forming a waveguide layer having a waveguide index of refraction greater than the substrate index of refraction and greater than the grating top index of refraction over the dielectric grating layer;
   f) defining and etching a waveguide having a longitudinal axis in the waveguide layer;
   g) forming a passivation layer having a passivation index of refraction substantially equal to the substrate index of refraction over the waveguide; and
   h) forming a waveguide to form grating dispersion compensator input/output (I/O) surface on the waveguide.

2. The method of claim 1, wherein step (b) includes the steps of
   b1) forming at least one patterned growth retarding layer on the substrate;
   b2) forming the grating layer base by selective area growth, the grating layer layer base having a changing thickness along the longitudinal axis, the thickness defined by a first predetermined function of position along the longitudinal axis; and
   b3) removing the at least one patterned growth retarding layer.

3. The method of claim 1, wherein the at least one grating period formed in steps (b) and (c) is a first predetermined function of position along the longitudinal axis.

4. The method of claim 1, wherein the grating pattern formed in step (b) includes a variable width, and the variable width is a first predetermined function of position along the longitudinal axis.

5. The method of claim 1, wherein step (d) further includes the steps of:
   d1) forming a first grating top sub-layer forming the variation in index of refraction
   d2) forming at least one patterned growth retarding layer on the first grating top sub-layer;
   d3) forming a spacing sub-layer by selective area over the first grating top sub-layer, the spacing sub-layer including a variable thickness, and the variable thickness being a first predetermined function of position along the longitudinal axis; and
   d4) removing the at least one patterned growth retarding layer.

6. The method of claim 1, wherein step (e) further includes the step of:
   e1) forming the waveguide layer as a plurality of sub-layers forming a quantum well structure.

7. The method of claim 1, wherein step (e) further includes the steps of:
   e1) forming at least one patterned growth retarding layer on the grating top layer;
   e2) forming the waveguide layer by selective area over the first grating top sub-layer, the waveguide layer including a plurality of sub-layers forming a quantum well structure having a variable thickness, the variable thickness defined by a first predetermined function of position along the longitudinal axis; and
   e3) removing the at least one patterned growth retarding layer.

8. The method of claim 1, further comprising the step of:
   i) forming an anti-reflective coating on the waveguide I/O surface.

9. The method of claim 1, further comprising the step of:
   i) forming at least one substrate electrode on the substrate; and
   j) forming at least one top electrode on the passivation layer.

10. The method of claim 1, further comprising the step of:
    i) forming at least one substrate electrode on the substrate;
    j) forming a resistive contact layer on the passivation layer; and
    k) forming at least one top electrode on the resistive contact layer.

11. The method of claim 1, further comprising the step of:
    i) forming a plurality of top electrodes on the passivation layer;
    wherein the passivation layer formed in step (g) includes a sub-layer of piezoelectric material.

12. The method of claim 1, further comprising the step of:
    i) forming at least one heating element on the passivation layer.

13. The method of claim 12, further comprising the step of:
    j) coupling a heating sink to the substrate.

14. The method of claim 12, further comprising the step of:
    j) coupling at least one temperature sensor to the substrate.

15. The method of claim 12, further comprising the step of:
    j) coupling at least one substrate electrode to the substrate;
    wherein the heating element formed in step (i) is electrically coupled to the passivation layer.

16. A method of manufacturing a grating dispersion compensator, comprising the steps of:
    a) providing a substrate;
    b) forming a waveguide layer over the substrate;
    c) defining and etching a waveguide in the waveguide layer;
    d) forming a spacing layer on the waveguide and the substrate, the spacing layer including a grating layer base;

e) defining and etching the grating layer base;

f) forming the grating top layer over the etch grating-base-layer such that the grating top layer and the grating base-layer form a dielectric grating layer having an index of refraction that changes to define at least one grating period;

g) forming a passivation layer over the dielectric grating layer; and h) forming a waveguide to form grating dispersion compensator input/output surface on the waveguide.

17. A method of manufacturing a grating dispersion compensator, comprising the steps of:

a) providing a substrate having a substrate index of refraction;

b) forming a plurality of patterned growth retarding layers on the substrate;

c) forming a grating layer base on the substrate having a grating base index of refraction greater than the substrate index of refraction on a portion of the top surface of the substrate by selective area growth, the grating layer base layer having a changing thickness along the longitudinal axis, the thickness defining a grating pattern in the grating layer base;

d) removing the at least one patterned growth retarding layer;

e) forming a grating top layer having a grating top index of refraction less than the grating base index of refraction over the etched grating layer base such that the grating top layer and the grating layer base form a dielectric grating layer having an index of refraction that changes to define at least one grating period;

f) forming a waveguide layer having a waveguide index of refraction greater than the substrate index of refraction and greater than the grating top index of refraction over the dielectric grating layer;

g) defining and etching a waveguide having a longitudinal axis in the waveguide layer;

h) forming a passivation layer having a passivation index of refraction substantially equal to the substrate index of refraction over the waveguide; and i) forming a waveguide to form grating dispersion compensator input/output (I/O) surface on the waveguide.

* * * * *